United States Patent [19]

Coelho et al.

[11] Patent Number: 5,646,866

[45] Date of Patent: Jul. 8, 1997

[54] PRELOADING FILES FOR SUBSEQUENT PROCESSING

[75] Inventors: Rohan Coelho; Alan Packer, both of Portland; Gary Baldes, Hillsboro, all of Oreg.

[73] Assignee: Intel Corporation, Santa Clara, Calif.

[21] Appl. No.: 388,699

[22] Filed: Feb. 15, 1995

[51] Int. Cl.$^6$ ................................................. G06K 15/00
[52] U.S. Cl. .................... 364/514 R; 364/514 A; 395/502
[58] Field of Search .................... 364/514 R, 514 C, 364/514 A; 395/162, 114, 163, 164; 348/180, 441

[56] References Cited

U.S. PATENT DOCUMENTS 5,411,272  5/1995  Naka et al. .
5,511,003  4/1996  Agarwal ........................... 364/514 R
5,519,438  5/1996  Elliott et al. ...................... 348/180

FOREIGN PATENT DOCUMENTS 0309373  3/1989  European Pat. Off. .
0597316  5/1994  European Pat. Off. .

Primary Examiner—Edward Cosimano
Assistant Examiner—Demetra R. Smith
Attorney, Agent, or Firm—Steve Mendelsohn; William H. Murray

[57] ABSTRACT

A file-processing subsystem exports functionality to an application to select optional preloading of a file by the file-processing subsystem. The application optionally selects preloading of the file and the file-processing subsystem preloads the file in accordance with the optional selection by the application. In one embodiment, video frames may be preloaded from a video file, where preloading may include decompressing the video frames. In addition, the preloaded video frames may be retained in memory for repeated display.

25 Claims, 9 Drawing Sheets

PRELOADING FILES FOR SUBSEQUENT PROCESSING

BACKGROUND OF THE INVENTION

1. Field of the Invention

The present invention relates to computers, and, in particular, to computer-implemented video games.

2. Description of the Related Art

Many computer games run on special purpose hardware. Other computer games are designed to run on general-purpose processors under commercially available operating systems. For example, certain computer games are designed to run on an Intel® processor under a Microsoft® Windows™ (MSW) operating system. In the past, designers of computer games have had to design their own software engines to interface with the computer's operating system and/or hardware. As a result, software engines typically differ from computer game to computer game, even between computer games developed by the same designers.

What is needed is a generic software engine for computer games running, for example, on an Intel® processor under a MSW operating system. If such a generic video-game software engine existed, then designers of computer games would be able to design their computer games to run on top of the generic software engine, thereby avoiding the cost and time in having to generate their own specific software engines.

It is an object of the present invention, therefore, to provide a generic software engine for computer games.

It is a particular object of the present invention to provide a generic software engine for computer games that run on an Intel® processor under a MSW operating system.

Further objects and advantages of this invention will become apparent from the detailed description of a preferred embodiment which follows.

SUMMARY OF THE INVENTION

The present invention comprises a computer system and a computer-implemented process for processing video signals in a video processing system. According to one embodiment, a file-processing subsystem exports functionality to an application to select optional preloading of a file by the file-processing subsystem. The application optionally selects preloading of the file and the file-processing subsystem preloads the file in accordance with the optional selection by the application.

The present invention also comprises an audio/video object library for a video processing system, wherein the audio/video object library exports functionality to an application to select optional preloading of a file by the audio/video object library. The application optionally selects preloading of the file, and the audio/video object library preloads the file in accordance with the optional selection by the application.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention relates to a software infrastructure that can be used by developers of software applications, such as computer game applications, to be run on computer systems, such as those running under a Microsoft® Windows™ (MSW) operating system on an Intel® Pentium™ processor. In general, the software infrastructure has a display subsystem that is designed to support applications that display one or more different types of data to a computer monitor. In addition, the software infrastructure provides for the inclusion of input/output (I/O), audio, communications, and/or capture subsystems to support I/O, audio, communications, and/or capture functions for the applications, respectively.

The displays for typical computer games may, for example, comprise one or more moving objects (called "sprites") overlaid on a fixed or relatively slowly moving background. The movements of the background and some of the sprites may be under the complete control of the computer game application, while the movements of other sprites may be affected by the player of the computer game (i.e., the human user of the computer system). For example, in the computer game Pac-Man, the player may use a joystick to control the movements of the Pac-Man sprite through a maze (i.e., a fixed background). At the same time, the Pac-Man sprite is chased by ghost sprites that are controlled by the Pac-Man application.

The displays for computer games (e.g., the images displayed in a window of a computer monitor) may be constructed from different bitmaps that represent the different pieces of the display. For example, a single graphics bitmap may represent a background scene for a computer game. Other graphics bitmaps may represent the different sprites that are to be overlaid on the background, wherein these other graphics bitmaps may be smaller than the background bitmap. A particular computer game display may be constructed by writing the bitmap pixels for the different pieces to a buffer, where the order in which the different bitmaps are written to the buffer dictates how the different pieces overlay one another in the display. Thus, to show Pac-Man in a maze, the maze bitmap is written to the buffer before the Pac-Man bitmap is written to the buffer.

The software infrastructure of the present invention supports the creation and manipulation of the pieces used in generating displays for a monitor. The infrastructure defines standard interfaces for a programmer to use to write software applications and other software libraries designed to provide computer operations, such as the playing of a computer game, that rely on the functionality of the infrastructure.

Hardware Architecture

Figure 1:
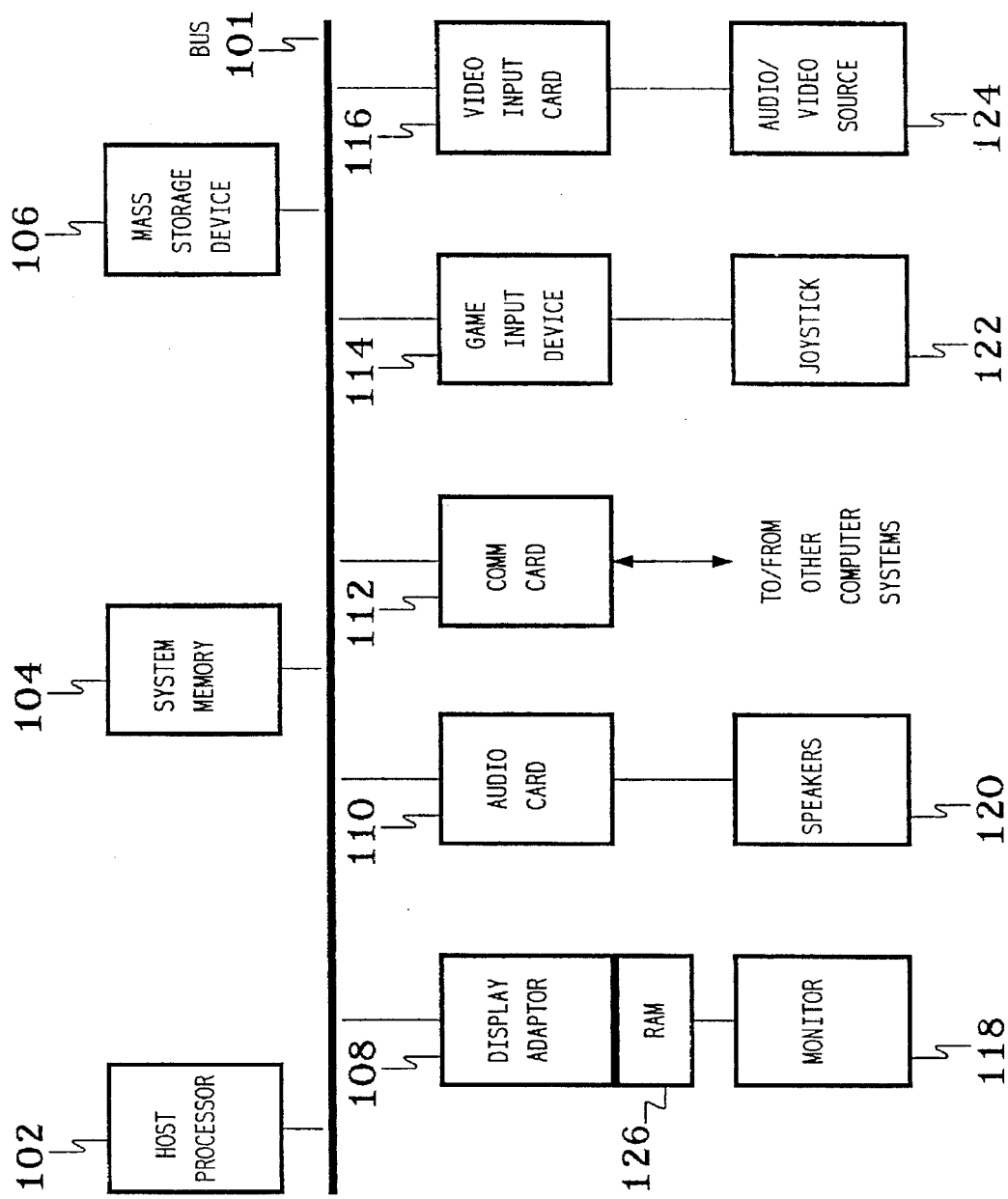
FIG. 1 is a block diagram of the system-level hardware architecture of a computer system, according to a preferred embodiment of the present invention.

Referring now to FIG. 1, there is shown a block diagram of the system-level hardware architecture of computer system 100, according to a preferred embodiment of the present invention. Computer system 100 provides the hardware that supports the implementation of computer games that run on top of the video-game software engines of the present invention.

Connected to system bus 101 of computer system 100 are host processor 102, system memory 104, mass storage device 106, and display adaptor 108. In addition, one or more of the following may be connected to system bus 101: audio card 110, communications (comm) card 112, game input device 114, and video input card 116.

Mass storage device 106 stores files containing sequences of video and graphics images and sequences of audio signals for the computer games. Sequences of audio/video frames may also be received by video input card 116 from audio/video source 124. Game input device 114 receives signals that are generated by joystick 122, which is manipulated by the computer game player. Host processor 102 accesses files from mass storage device 106 and receives signals from game input device 114 and video input card 116. Host processor 102 uses these files and signals to generate the display and audio portions of the computer game. Host processor 102 transmits display signals to random access memory (RAM) 126 of display adaptor 108. Display adapter 108 processes the display signals for display on monitor 118. Similarly, audio card 110 receives audio signals from host processor 102 and processes the audio signals for play on speakers 120.

Bus 101 may be any suitable system bus, such as an industry standard architecture (ISA) or extended ISA (EISA) bus, and is preferably a Peripheral Component Interconnect (PCI) bus. Host processor 102 may be any suitable general purpose processor and is preferably an Intel® Pentium™ processor. System memory 104 may be any suitable standard system memory device. Mass storage device 106 may be any suitable device for storing data and is preferably a hard drive or a compact disk (CD) read-only memory (ROM).

Display adaptor 108 may be any suitable device for driving a display monitor and is preferably a device for driving a super video graphics array (VGA) monitor. RAM 126 may be any suitable memory device and is preferably a dynamic RAM (DRAM) or a video RAM (VRAM). Audio card may be any suitable device for driving speakers of a type suitable for a PC environment. Comm card 112 may be any suitable device for communicating with other computer systems, such as a modem card or a local area network (LAN) card, over a network.

Game input device 114 may be any suitable device for providing the player with an interface to computer system 100 and is preferably a Sega® joystick. Those skilled in the art will understand that player-interface devices other than a joystick may be used, such as a steering wheel and pedals, an airplane yoke, a golf club, or a virtual reality glove. It will also be understood that the computer keyboard may function as the player-interface device.

Video input card 116 may be any suitable device for capturing audio/video signals from an audio/video source and is preferably an Intel® SmartVideo Recorder™ card. Audio/video source 124 may be any suitable source of audio/video signals, such as a video camera, a VCR, an antenna, or a video cable.

Software Architecture

Figure 2:
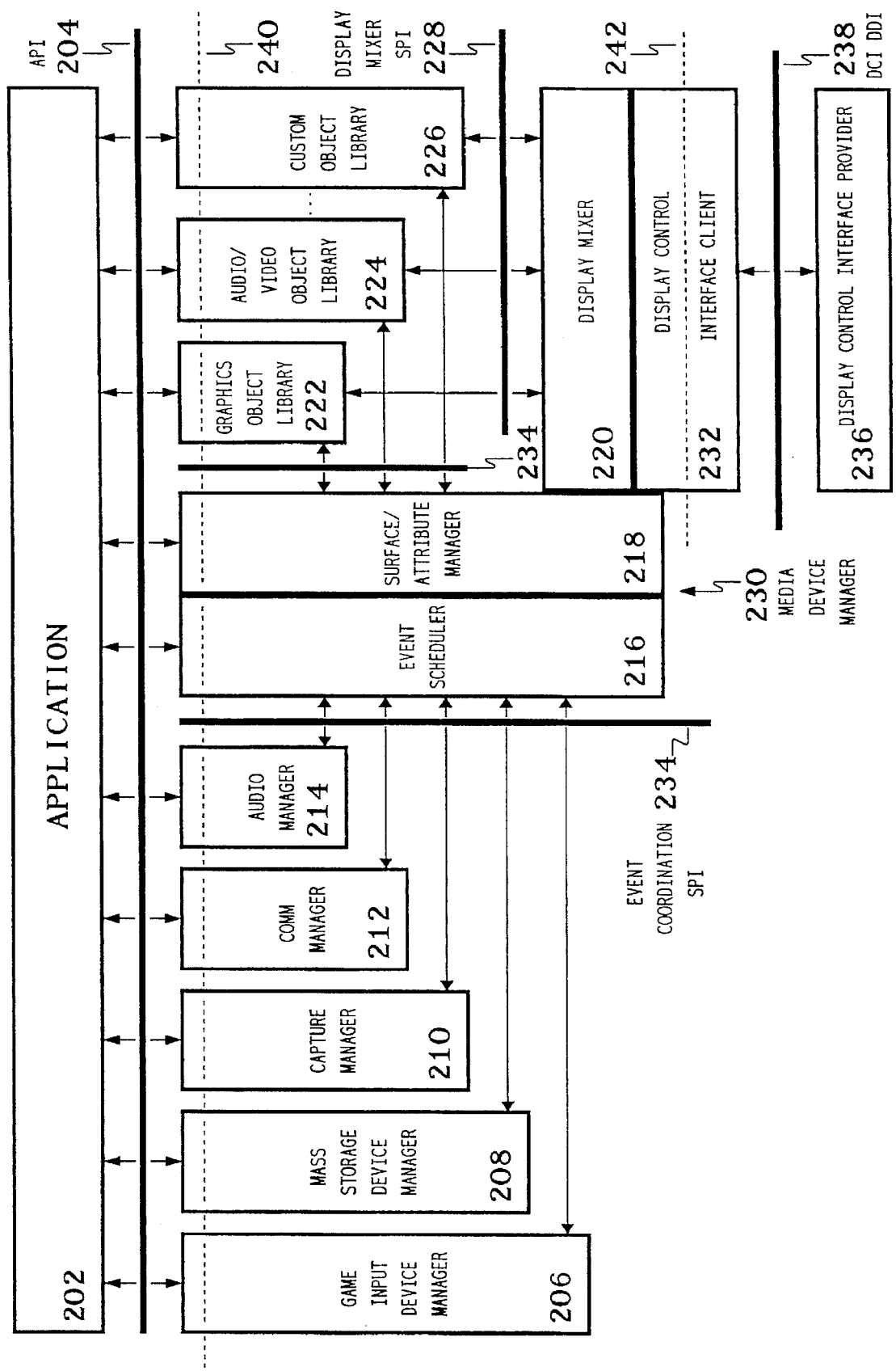
FIG. 2 is a block diagram of the system-level architecture for the software running on the host processor of the computer system of FIG. 1.

Referring now to FIG. 2, there is shown a block diagram of the system-level architecture for the software running on host processor 102 of computer system 100 of FIG. 1. The software system comprises application 202, media device manager 230, and one or more object libraries 222-226. In addition, the software system comprises managers and interfaces for interfacing between host processor 102 and the other hardware components shown in FIG. 1. For example, component managers 206-214 of FIG. 2 provide interfaces to the game input device 114, the mass storage device 106, the video input card 116, the comm card 112, and the audio card 110 of FIG. 1. Similarly, display control interface (DCI) client 232, DCI device driver interface (DDI) 242, and DCI provider 236 provide an interface between the media device manager 230 of FIG. 2 and the display adaptor 108 of FIG. 1. The DCI client, DCI DDI, and DCI provider are described in co-pending U.S. patent application Ser. No. 08/103,399, filed Aug. 6, 1993, the disclosure of which is incorporated herein by reference.

Media device manager 230 comprises event scheduler 216, surface/attribute manager 218, and display mixer 220. The object libraries may include a graphics object library 222, an audio/video object library 224, and/or one or more additional custom object libraries 226. Media device manager 230 and object libraries 222-226 are dynamic link libraries. The application communicates with the object libraries and the media device manager using application program interface (API) 204. The object libraries communicate with the display mixer using display mixer service provider interface (SPI) 228. In addition, the object libraries 222-226 and component managers 206-214 can also communicate with the event scheduler using event coordination SPI 234. The object libraries 222-226 can also communicate with the surface/attribute manager 218 using API 204.

In a preferred embodiment of the present invention, all portions of software modules above dashed line 240 and all portions of software modules below dashed line 242 are implemented under a non-preemptive MSW operating system, where the MSW operating system is implemented as a task under an Intel® iASPOX™ operating system. All portions of software modules that are both below dashed line 240 and above dashed line 242 are implemented as one or more tasks under the preemptive iASPOX™ operating system. The Intel® iASPOX™ operating system is described in co-pending U.S. patent application Ser. No. 08/323,044, filed Oct. 13, 1994, the disclosure of which is incorporating herein by reference.

For example, in the embodiment of FIG. 2, part of graphics object library 222 is implemented under the MSW operating system and the rest of graphics object library 222 is implemented as part of an iASPOX™ task that is different from the MSW operating system. Similarly, part of the DCI client 232 is implemented under the MSW operating system and the rest of the DCI client 232 is implemented as part of an iASPOX™ task that is different from the MSW operating system. The application 202, on the other hand, is implemented entirely under the MSW operating system, while the display mixer 220 is implemented entirely as part of a separate iASPOX™ task.

A software module that is implemented under a non-preemptive MSW operating system is unable to interrupt any other software module running under that MSW operating system. If all of the software modules of the present invention were implemented under a non-preemptive MSW operating system, then critical operations would not be able to be performed if another module running under that MSW operating system had the attention of the processor. As a result, system performance (e.g., the timely playback of an audio/video file) may be adversely affected.

On the other hand, when the MSW operating system is implemented as an iASPOX™ task, a software module that is implemented as a separate task under the iASPOX™ operating system, is able to interrupt a module running under the MSW operating system. Those skilled in the art will understand that one purpose for the software implementation scheme shown in FIG. 2 is to provide some of the software modules of the computer system of the present invention with the ability to interrupt processes running under a non-preemptive MSW operating system. This interrupt capability may be important in order to ensure satisfactory system performance by preventing MSW modules from preoccupying the processor.

It will also be understood by those skilled in the art that, under alternative embodiments of the present invention, one or more of the modules shown in FIG. 2 as being implemented entirely or partially as a separate iASPOX™ task could be implemented entirely under the MSW operating system. Since there are overhead penalties involved in communications between a module implemented under the MSW operating system and a module implemented as a separate iASPOX™ task, the decision as to how to implement a given software module (i.e., how much of the module to implement under the MSW operating system and how much, if any, to implement as a separate iASPOX™ task) may depend on such factors as (1) the expected frequency of communications between the given module and other modules, and (2) the criticality of the functions implemented by the module (i.e., the importance of being able to interrupt other processing).

Application Program Interface

API 204 of FIG. 2 defines a set of functions called by application 202 to control the operations of media device manager 230, object libraries 222–226, and component managers 206–214. These functions may be broken into the following categories:

Graphics object functions;
Audio/video object functions;
Surface/attribute functions;
Meta-functions;
Scheduling function; and
Component manager functions.

The application uses the component manager functions to control the operations of component managers 206–214. Many of the API functions are defined in further detail later in Appendix A of this specification.

The media device manager 230 of FIG. 2 provides a mechanism for drawing one or more objects to a destination. Different types of objects are possible, including graphics objects and audio/video objects. Objects are drawn to a destination which may be the display buffer for the computer monitor or a specified memory location. The destination for one or more objects is called a surface. Surfaces may themselves be treated as objects. The media device manager provides functions that manipulate, animate, and group objects as well as their destinations.

A surface is the destination where the objects are rendered (i.e., drawn). A surface may be the actual display buffer or a specified memory location. When a surface is created, its width and height (in pixels) and the pixel format are specified. When the destination for a surface is a specified memory location, a portion of memory is allocated to that surface. An option exists to create a surface with a specified default color. If the default color option is not selected, then the pixels of the surface will contain whatever values were present in the allocated portion of memory when the surface was created.

An object is a set of data that is rendered to the surface. Each object has the following attributes:

Size: The width and height of the object in pixels.

Position: The (x,y) coordinate in pixels of the upper left corner of the object relative to the upper left corner of the surface to which the object is rendered.

Draw Order: A value that indicates when the object is rendered to the surface with respect to other objects. Each surface can be considered to be composed of a number of drawing planes which are rendered to the surface in priority order, back to front. An object's draw order is the number of the plane to which it is drawn.

View: The rectangular region of the object that is actually rendered to the surface. The portion of the object that is rendered to the surface may be limited to any rectangular subset of the object. This provides the capability to window into or to scroll within an object.

Visibility: A boolean value that indicates whether or not to render the object to the surface. This provides the capability to remove an object from a surface while preserving its attributes should the object need to be displayed later.

Sequencing/Current Image: An object is said to be sequenced if it comprises more than one image, wherein only one image can be rendered during a given draw time. The current image is the image of a sequenced object that is rendered to the surface during the current draw time.

Destination: The location of the surface to which the object is rendered. Destination may be the display buffer or a specified memory location.

Attributes affect the manner in which the object data is rendered to a surface. Some attributes can be changed after the object is created to change that display manner.

Graphics Objects

The media device manager of FIG. 2 supports different types of graphics objects, including sprites, backgrounds, tiles, and grids.

A sprite is a sequence of one or more two-dimensional bitmaps. The size of a sprite is the width and height in pixels of the bitmaps. The view of a sprite is always equal to its size. As a result, the media device manager cannot window into or scroll within a sprite. When a sprite comprises more than one image, the sprite is sequenced. As a result, the sequence of images within the sprite can be cycled through by altering the current image attribute.

Like a sprite, a background is a sequence of one or more two-dimensional bitmaps. The view attribute of a background can be specified. As a result, the media device manager can window into and scroll within a background.

A tile is also similar to a sprite in that it is a sequence of one or more two-dimensional bitmaps. Like a sprite, a tile's view is always equal to its size, thereby preventing the media device manager from windowing into and scrolling within a tile. A tile's destination is an array entry in a grid and is rendered to the surface only when the grid is rendered. The tile's position is determined by its slot in the grid. A tile does not have a draw order of its own, since it is rendered to a surface only when the grid is rendered. A tile has an additional attribute called the active attribute. The active attribute is a boolean value that indicates whether the tile is rendered when its grid is rendered. This active attribute provides the capability to turn a specific tile on or off in a grid without deleting the tile.

A grid is similar to a background, but the data for a grid is determined by an array (or matrix) of equally sized tiles. The view attribute permits the media device manager to display any rectangular subset of tiles within the grid to window into and scroll within the grid.

As mentioned above, a surface can itself be treated as an object. The data for a surface is determined by all of the objects which have the surface as their destination. The media device manager can display any rectangular subset of a surface to window into and scroll within the surface. A surface cannot be sequenced. The destination for a surface can be another surface.

API Functions

As described above, API 204 defines the following sets of functions:
Graphics object functions;
Audio/video object functions;
Surface/attribute functions;
Meta-functions;
Scheduling functions; and
Component manager functions, including audio functions and communications functions.

Graphics Object Functions

Figure 3:
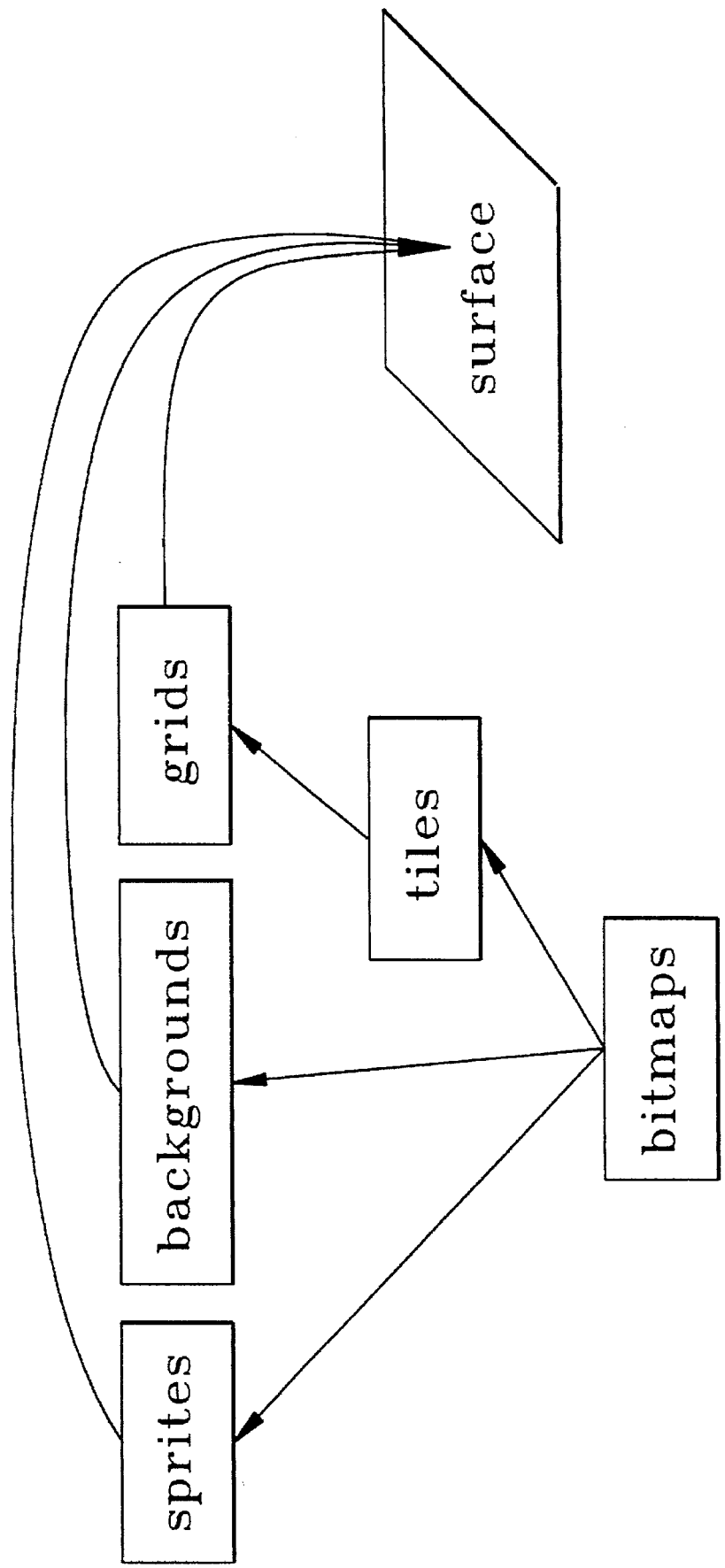
FIG. 3 shows the relationship between bitmaps, graphics objects (i.e., sprites, backgrounds, tiles, and grids), and surfaces.

Referring now to FIG. 3, there is shown the relationship between bitmaps, graphics objects (i.e., sprites, backgrounds, tiles, and grids), and surfaces. Bitmaps, which are themselves undisplayable, are the basic building blocks of graphical data for sprites, backgrounds, and tiles. Tiles are themselves rendered to grids. Sprites, backgrounds, and grids are rendered to surfaces. A surface that is rendered in turn to another surface is called a virtual surface. A surface may be the display buffer or another specified location in memory. The graphics object functions are exported by the graphics object library 222 of FIG. 2.

Bitmap Functions

API 204 of FIG. 2 provides the following bitmap functions:
EACreateBitmap
EADeleteBitmap
EALoadBitmap
EASetBitmapBits
EAGetBitmapBits
EAGetBitmapPointer
EASetBitmapTransparency
EAGetBitmapTransparency The EACreateBitmap function creates a bitmap. Parameters passed to the function call include width, height, and pixel format. A combination of three parameters are used to specify pixel format: color type, bit count, and a mask array. Color types include, for example, color formats based on RGB components and YUV components. Bit count specifies the bit depth of the pixel. For example, a bit depth of 8 specifies eight bits per pixel and is the common reference for palette-based RGB8 data. In some RGB formats, the bit depth is not sufficient to completely specify the format. A mask array is provided to specify the bit mask for each of the R, G, and B colors.

The EADeleteBitmap function deletes a specified bitmap.

A bitmap created by calling the EACreateBitmap function does not yet have any data in it. The EALoadBitmap function loads data from a file into a bitmap. Alternatively, the EASetBitmapBits function transfers data from a memory location into a bitmap.

The EAGetBitmapBits function retrieves data from a specified bitmap into a specified destination. The EAGetBitmapPointer function retrieves the selector and offset corresponding to a specified bitmap.

An bitmap object comprises one or more rectangular pixel regions, but not all the data in the regions need be valid. An application can specify that invalid data not be written to the monitor by using a transparency notation. Transparency can be specified using the EASetBitmapTransparency function. Computer system 100 allows for a variety of transparency formats: palette key, color key, or transparency bitmask. Palette key is used when a specific palette index that indicates transparency is embedded in the original object data. Color key is used when true color is used instead of palette-based data. A transparency bitmask is used when transparency data is to be specified in an independent bitmap. This bitmap must be of the same size as the original object bitmap. Transparency styles are defined as follows:
EATS_PALETTE_KEY Color index in the range of 0 to 255.
EATS_COLOR_KEY Color value.
EATS_BITMAP Handle to a bitmap.
EATS_NONE Bitmap has no transparency value.

The EAGetBitmapTransparency function returns transparency information for a specified bitmap object.

Sprite Functions

API 204 of FIG. 2 provides the following sprite functions:
EACreateSprite
EACreateSequencedSprite
EADeleteSprite
EASetSpriteData
EAGetSpriteData
EASetSequencedSpriteData
EAGetSequencedSpriteData The EACreateSprite function creates a sprite. The function call returns a handle to the sprite object. When a sprite is created, no data is associated with it. The EASetSpriteData function allows data from a bitmap to be associated with a sprite. The bitmap must be created by the EASetSpriteData function is called.

A sprite can be associated with a set of bitmaps with only one being visible at any given time. If the series of bitmaps is cycled through one by one over a periodic interval, the illusion of motion can be created. Associating a sprite with several bitmaps is termed sequencing a sprite. The EACreateSequencedSprite function creates a sequenced sprite. The application specifies the number of bitmaps that are part of the sequence. The data associated with each image in the sequence can be set by using the EASetSequencedSpriteData function.

Figure 4:
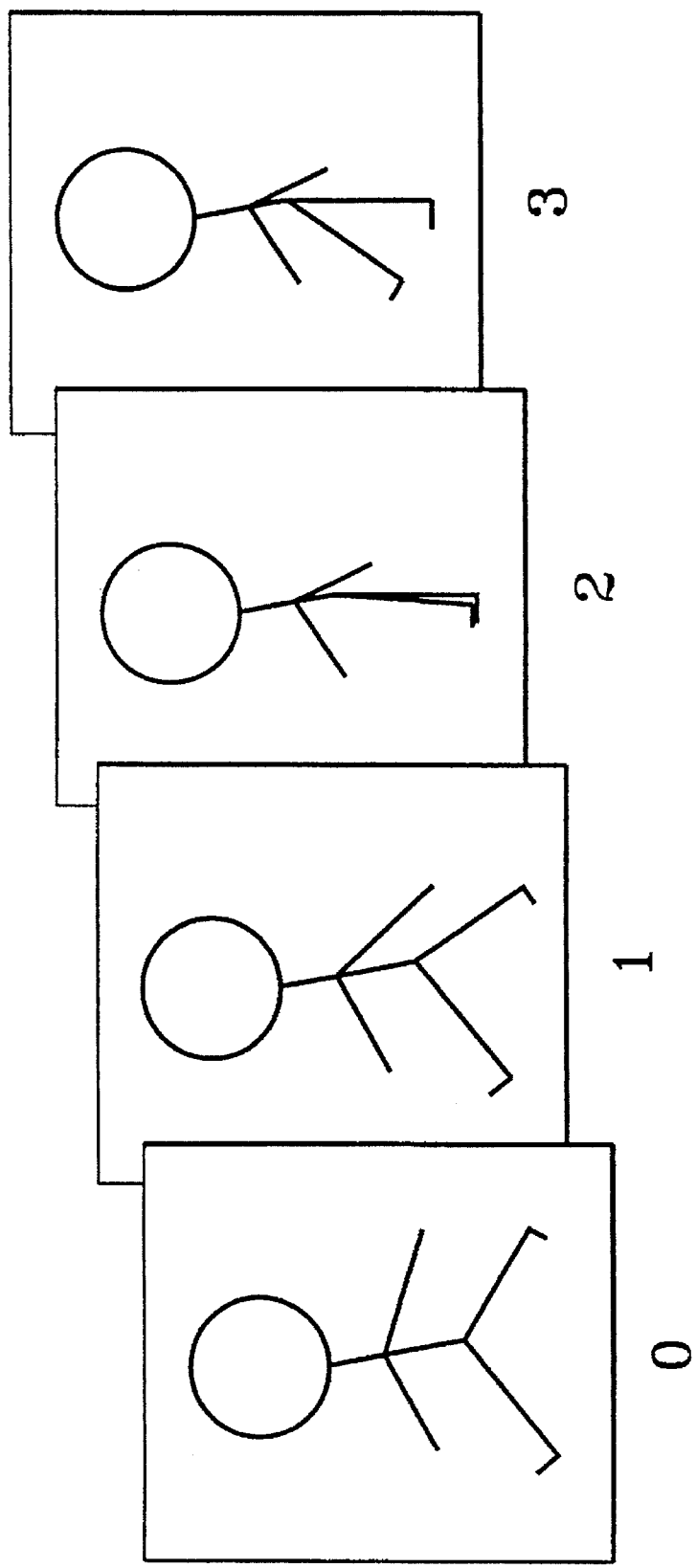
FIG. 4 shows an example of a sequenced sprite associated with four bitmaps.

Referring now to FIG. 4, there is shown an example of a sequenced sprite associated with four bitmaps. By cycling the sprite data through each of the four bitmaps over a periodic interval, the notion of the stick figure walking can be conveyed.

The EAGetSpriteData function retrieves the data set for a specified sprite. The EAGetSequencedSpriteData function retrieves the data set for a specified sequenced sprite.

The EADeleteSprite function deletes a specified sprite.

Background Functions

API 204 of FIG. 2 provides the following background functions:
EACreateBackground
EACreateSequencedBackground
EADeleteBackground
EASetBackgroundData
EASetSequencedBackgroundData EAGetBackgroundData
EAGetSequencedBackgroundData A background is like a sprite except that a background can have a view. A view allows an application to display only a portion of a larger object. Moving the view around permits scrolling of the object.

A background is created using the EACreateBackground function. This function call returns a handle to the background. A background has no data associated with it when it is created. Data may be associated with a background by using the EASetBackgroundData function. This call associates a bitmap with a background. The application must therefore create the bitmap prior to calling the EASetBackgroundData function.

Like sprites, backgrounds may be sequenced. A sequenced background is created with the EACreateSequencedBackground function. The application specifies the number of bitmaps that are part of the sequence. The data associated with each image in the sequence can be set by using the EASetSequencedBackgroundData function.

Figure 5:
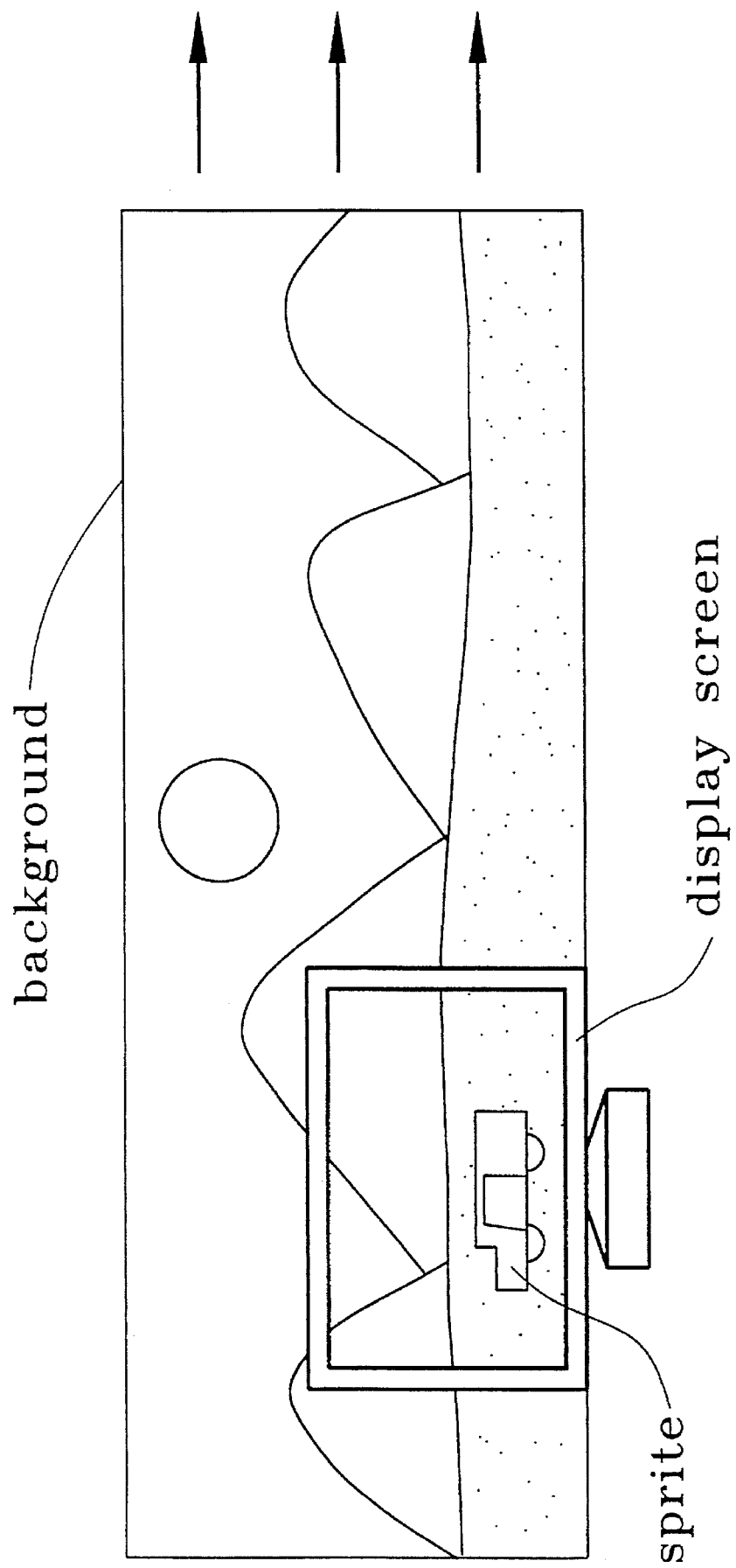
FIG. 5 shows an example that illustrates the use of a view within a background to convey a moving truck.

Referring now to FIG. 5, there is shown an example that illustrates the use of a view within a background to convey a moving truck. The truck, which is a sprite, is stationary. By scrolling the background to the right and having only a portion of it visible on the display monitor at a given time (i.e., by changing the view within the background), the illusion of the truck travelling to the left is created.

The EADeleteBackground function deletes a specified background.

The EAGetBackgroundData function retrieves the data set for a specified background. The EAGetSequencedBackgroundData function retrieves the data set for a specified sequenced background.

Tile and Grid Functions

API 204 of FIG. 2 provides the following tile and grid functions:
EACreateTile
EACreateSequencedTile
EADeleteTile
EASetTileData
EASetSequencedTileData
EAGetTileData
EAGetSequencedTileData
EASetActiveState
EAGetActiveState
EACreateGrid
EADeleteGrid
EASetGridData
EAGetGridData
EAClearGridData
EACreateFlatGrid
EADeleteFlatGrid
EASetFlatGridData
EAGetFlatGridData
EAClearFlatGridData
EACreateFixedGrid
EADeleteFixedGrid
EASetFixedGridData
EAGetFixedGridData
EAClearFixedGridData A grid is a two-dimensional matrix of equally sized tiles. A tile itself is a graphics object which supplies data to grids. A single tile may be used in many locations within a grid. This capability allows for pattern replication.

A tile is created using the EACreateTile function. This function call returns a handle to the tile. When a tile is created, it has no data associated with it. Data may be associated with a tile using the EASetTileData function. This function call associates a bitmap with a specified tile. The application must create the bitmap prior to calling the EASetTileData function.

A grid is created using the EACreateGrid function. This function call returns a handle to the grid. The application specifies the size of the matrix when creating the grid. The application also specifies the size of the tiles within the grid. Tiles in a grid are set using the EASetGridData function. The size of the tiles must match the size specified during the EACreateGrid function call.

Like sprites and backgrounds, tiles within a grid may be sequenced. Sequencing of tiles permits a replicated pattern to be sequenced by changing the underlying tile itself. For example, to provide the image of a field of grass waving in the breeze, a grid with many locations can be created and all locations can be made to point to the same grass tile. Sequencing this tile effectively sequences the entire field of grass. The EACreateSequencedTile and EASetSequencedTileData functions create and initialize sequenced tiles, respectively.

A tile can be made active or inactive using the EASetActiveState function. This function controls the visibility of a replicated pattern within a grid by merely activating or deactivating the underlying tile itself.

The EADeleteTile function deletes a specified tile. The EADeleteGrid function deletes a specified grid. The EAClearGridData function clears the tile at location loc in the grid.

The EAGetTileData function retrieves the data set for a specified tile. The EAGetSequencedTileData function retrieves the data set of a specified sequenced tile. The EAGetActiveState function retrieve the state of the active attribute of a specified tile. The EAGetGridData function retrieves the tile that was previously set for a specific location on a grid.

Figure 6:
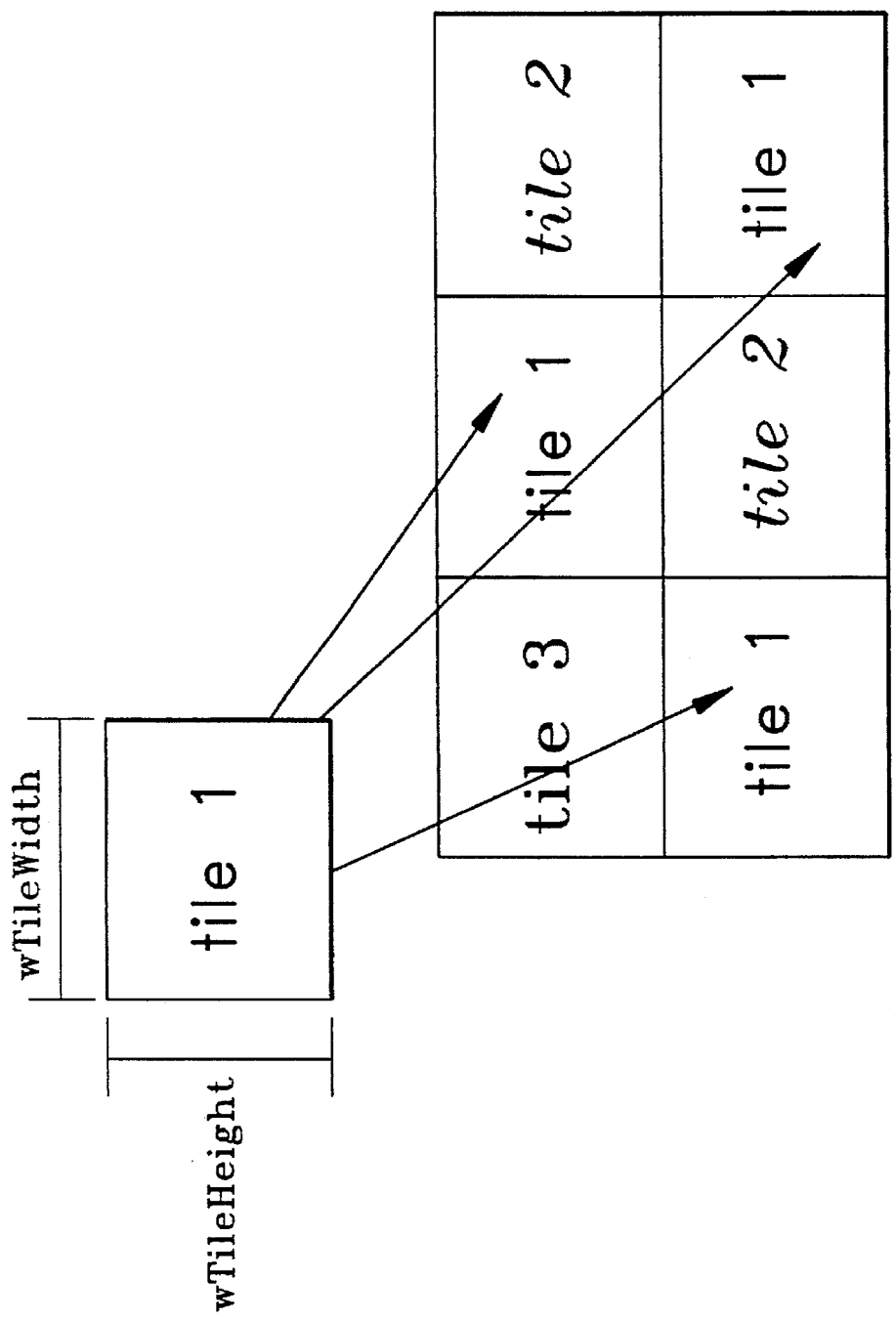
FIG. 6 shows an example of a grid consisting of a (2×3) array of six tiles.

Referring now to FIG. 6, there is shown an example of a grid consisting of a (2×3) array of six tiles, where each grid location has width wTileWidth and height wTileHeight. In FIG. 6, tile 1 is replicated in grid locations (0,1), (1,0), and (1,2), and tile 2 is replicated in grid locations (0,2) and (1,1).

In addition to the type of grid described above (i.e., the regular type of grid), there is a special type of grid called a flat grid. For a regular type of grid, each tile in the grid is stored to memory with its own selector. For a flat grid, all of the tiles are stored in one large region of memory accessed with a single common selector. When drawing a flat grid, only one selector is loaded for the entire grid. Since changing selectors would increase the processing time, flat grids provide more efficient processing during the draw operation. Using a flat grid requires the object library to perform the memory management for the flat grid's data.

A flat grid is created using the EACreateFlatGrid function. This function call returns a handle to the flat grid. The application specifies the size of the matrix when creating the flat grid. The application also specifies the size of the tiles within the flat grid. Tiles in a flat grid are set using the EASetFlatGridData function. The size of the tiles must match the size specified during the EACreateFlatGrid function call.

The EAGetFlatGridData function retrieves the tile that was set for a specific location on a flat grid via a previous EASetFlatGridData call. The EADeleteFlatGrid function deletes a specified flat grid. The EAClearFlatGridData function clears the tile in the flat grid at location loc.

A fixed grid is a grid in which each tile has a fixed size of (8×8) pixels. The EACreateFixedGrid function creates a grid with locations fixed at 8 pixels wide by 8 pixels high. The EADeleteFixedGrid function deletes a previously created fixed grid object. The EASetFixedGridData function sets a tile at a particular fixed grid location. The EAGetFixedGridData function retrieves the tile that was set for a specific location on a fixed grid via a previous EASetFixedGridData call. The EAClearFixedGridData function clears the tile in the fixed grid location.

Audio/Video Object Functions

The source of audio/video data for computer system 100 may be a file stored on mass storage device 106 of FIG. 1, which may be, for example, a CD-ROM or a hard disk. Alternatively, the source for audio/video data may be a continuous audio/video stream. A continuous audio/video stream may correspond to audio/video signals received by comm card 112 over a network from a remote node. Alternatively, a continuous audio/video stream may correspond to audio/video signals received by video input card 116 from audio/video source 124, which may be, for example, a video camera, VCR, television antenna, or video cable. When application 202 of FIG. 2 wants to access audio/video data, it calls the appropriate function into audio/video object library 224, which returns a handle to the source of the audio/video data back to the application.

In a preferred embodiment, audio/video object library 224 supports the decompression and playback of data from Microsoft® Audio Video Interleaved (AVI) files and Microsoft® WAV™ files. An AVI file can contain many data streams, but typically contains only two: one for audio and one for video. A WAV file contains a single audio stream.

An audio stream is a sequence of audio samples, each of which is a unit of audio data. The size of the unit is determined by the audio stream. An audio clip is a contiguous sequence of two or more audio samples. A video stream is a sequence of frames, each of which can be thought of as a single snapshot, like a frame of a movie film. A video clip is a contiguous sequence of two or more video frames. In this specification, the term "sample" may refer to video data and/or audio data, depending on the context. The term "audio/video clip" may refer to an audio clip and/or a video clip, depending on the context.

The media device manager 230 of FIG. 2 treats audio/video clips as sequenced objects, where each audio/video frame is an image of the sequenced object. The option exists to identify and specify individual samples of an audio/video clip by sequence number (i.e., the number of the frame in the clip) or by time (i.e., relative to the beginning of the clip).

When the audio/video source is a Microsoft® AVI file, the AVI file header indicates whether the video data in the file is compressed, and, if so, indicates the compression algorithm used. Using this file header information, the audio/video object library 224 causes the appropriate video codec to be loaded. The AVI file may also contain audio data that may be processed using an audio codec.

To play an audio/video clip, an application 202 first creates an audio/video object and then loads the file containing the clip. To load the file, the audio/video object library 224 (1) reads the file header, (2) loads the proper codec, if needed (i.e., if the clip is compressed), and (3) creates buffers for holding compressed and decompressed data, if needed.

Like a graphics object, an audio/video object is created by the display mixer 220 and contains both generic bytes and object-specific bytes. The generic bytes define the audio/video object as a generic object and allow the audio/video object to inherit all generic object features. The object-specific bytes define the special characteristics of an audio/video object. Together, both sets of bytes allow the audio/video object to be manipulated by the API functions.

Because an audio/video object is a generic function, an application 202 can use certain generic object functions on it. For example, an application can place an audio/video object on a surface with other objects (of any type), group an audio/video object with other objects (of any type), and treat an audio/video object as a sequenced object. An application can also use the time, scheduling, and repeat functions of the event scheduler 216 on an audio/video object.

An application 202 can also apply audio/video functions to an audio/video object. For this purpose, the audio/video object library 224 associates the following information with an audio/video object:

Buffer pointers Pointers to compressed-data and decompressed-data buffers.

Audio/video pointers Pointers to the audio/video file and clip.

Samples in clip Total number (N) of samples in the audio/video clip; samples are numbered from 1 to N.

Current sample index Number, from 1 to N, of the sample currently being display (video) or played (audio). The sample index is 1, if no samples have been displayed or played.

Timebase User-definable variable that defines whether the offset used in seek operations represents samples or milliseconds. The default is milliseconds.

The compressed video data are read from the file and passed to the video codec for decompression. At draw time, the display mixer 220 calls the draw function in the audio/video object library 224 to instruct the audio/video object library to draw the current video data to the surface. The audio/video object library may accept either a time or a sequence number to determine what video data to render to the surface. Effects can be applied to the video data similar to those applied to graphics objects, including notions of transparency.

The media device manager 230 may schedule decompression and drawing at staggered times. In this case, the codec decompresses and writes the decompressed video data into an intermediate buffer. At draw time, the audio/video object library will copy the decompressed video data onto the draw surface (whether the draw surface is the display buffer or a specified memory location). In other situations, the media device manager may ask for decompression and drawing at the same time. In this case, the codec decompresses and writes the decompressed video data directly onto the draw surface (again, either the display buffer or a memory location).

API 204 of FIG. 2 provides functions to create and manipulate audio/video objects. These audio/video functions may be broken into three categories: general audio/video functions, audio/video control functions, and non-linear audio/video functions. The audio/video object functions are exported by the audio/video object library 224 of FIG. 2. Audio/video object library 224 supports the following audio/video operations:

Video scaling;
Video color conversion;
Video clipping;
Mixing video with other display streams, including video on graphics and video on video;
Mixing multiple audio streams with other display streams, including audio with audio, video, and/or graphics;
Preloading multiple audio and video clips and using branch tables to "vector" (i.e., transition) to the needed clip immediately;
Treating audio and video clips as sequenced objects; and Supporting installable codecs, including control mechanisms that automatically handle backup, degradation, etc.; transparency; and the codec interface defined by the flat memory model used by Microsoft® Windows 95™ and Windows NT™ operating systems.

General Audio/Video Functions

API 204 of FIG. 2 provides the following general audio/video functions:

EAAVCreateObject
EAAVLoadFile
EAAVDeleteObject
EAAVPlay
EAAVPause
EAAVResume
EAAVStop To prepare for playback, two functions are called: EAAVCreateObject and EAAVLoadFile. The EAAVCreateObject function creates an audio/video object and returns a handle to it. The EAAVLoadFile function opens an audio/video file, reads the file's main and stream headers, and uses the information from the headers to set various attributes, both generic and specific, in the audio/video object created by EAAVCreateObject. EAAVCreateObject and EAAVLoadFile do not load any samples into the compressed-data buffer or decompress the data into the decompressed-data buffer.

The EAAVDeleteObject function deletes an audio/video object, closes its file, and releases the resources allocated to it. These resources include the memory used for the object itself, for the buffers, and for the codec.

The EAAVPlay function plays an audio/video clip from a caller-defined start position to a caller-defined stop position. The start and stop positions are defined in samples or milliseconds, depending on the value of the timebase. If an audio/video clip has not been preloaded, the EAAVPlay function also loads the clip into the compressed-data buffer and decompresses it into the decompressed-data buffer before playback. The call to EAAVPlay returns immediately, but the audio/video clip continues to play as determined by the value of the P_REPEAT parameter. If P_REPEAT is TRUE, then the clip repeats until the application stops it by calling EAAVPause or EAAVStop. If P_REPEAT is FALSE, then the clip plays until it reaches the stop position or the application stops it by calling EAAVPause or EAAVStop. When a video clip is paused (EAAVPause), stopped (EAAVStop), or reaches its stop position, then the most recently displayed frame of the clip continues to be displayed until the EAAVDeleteObject function is called.

When the application calls the EAAVPlay function in the audio/video object library, the audio/video object library may call the appropriate API functions into the event scheduler to instruct the event scheduler to schedule a repeating event whereby the frames in the audio/video clip are decoded at a specified rate. At draw time, the display mixer calls the audio/video object library's draw function to render the next video frame to the surface. In this way, the frames of the audio/video clip are decoded and displayed without any calls from the application into the audio/video object library after the initial EAAVPlay call.

The EAAVPause function pauses an audio/video clip. The EAAVStop function stops an audio/video clip. The EAAVResume function resumes playing a paused audio/video clip, but has no effect on a clip that has been stopped (EAAVStop) or has reached its stop position.

Audio/Video Control Functions

API 204 of FIG. 2 provides the following audio/video control functions:

EAAVSetTimebase
EAAVGetTimebase
EAAVSendCodecMessage
EAAVSeek
EAAVSetQuality

The EAAVSetTimebase function sets the audio/video object's timebase to samples or milliseconds. The default is samples. The EAAVGetTimebase function returns whether the audio/video object's timebase is samples or milliseconds.

The EAAVSendCodecMessage function sends a message to the installed video codec. This function may be used by an application 202 of FIG. 2 to control application-specific video codec features that the media device manager 230 and the audio/video object library 224 may be unaware of.

The EAAVSeek function moves the sample pointer for an audio/video clip to the specified sample or time. Using a caller-defined start position and offset, the EAAVSeek function moves forward or backward through an audio/video clip. The start position may be the beginning of the clip, the current sample index, or the end of the clip. The offset value is interpreted in terms of the timebase.

The EAAVSetQuality function sets the video quality.

Non-Linear Audio/Video Functions

API 204 of FIG. 2 provides the following non-linear audio/video functions:

EAAVCreateLoop
EAAVDeleteLoop
EAAVPreload
EAAVFlush
EAAVCreateVectorTable
EAAVDeleteVectorTable
EAAVGetTableEntry
EAAVSetTableEntry
EAAVClearTableEntry
EAAVClearVectorTable
EAAVChooseTableEntry Audio/Video Loops The EAAVCreateLoop function creates a loop in an audio/video clip. An audio/video loop is a sequence of two or more consecutive audio/video samples that is repeated one or more times. An audio/video loop may be placed anywhere within an audio/video clip by specifying the beginning and end positions for the loop (using samples or milliseconds, depending on the setting of timebase). The loop may be repeated a specified number of times or instructed to repeat indefinitely. If the specified repeat count is "infinite", then the loop is repeated until the application calls EAAVDeleteLoop, EAAVPause, or EAAVStop.

If the samples in an audio/video clip are numbered from 1 to N, then the samples in an audio/video loop are numbered from i to j, wherein $1 \leq i < j \leq N$. An audio/video clip can be coincident with the entire loop (i.e., the loop can be numbered from 1 to N, like the clip). An audio/video loop may be nested within another audio/video loop. That is, a loop numbered from k to l may be nested within a loop numbered from i to j, where $i \leq k < l \leq j$.

An audio/video loop is displayed when the clip containing it is displayed. When an audio/video loop stops playing, either because it has reached its endpoint (for non-infinite play) or because the application has deleted it (EAAVDeleteLoop), then the clip containing the loop continues to play until it reaches the stop position specified in the EAAVPlay call or until it is paused (EAAVPause) or stopped (EAAVStop) by the application.

The EAAVDeleteLoop function deletes an audio/video loop.

Preloading Audio/Video Clips

As mentioned earlier in the discussion of EAAVCreateObject and EAAVLoadFile, opening an audio/video clip does not load any of its samples into memory or decompress them. The audio/video object library 224 provides two functions to support preloading of audio/video clips: EAAVPreload and EAAVFlush. These functions can be used to preload samples into the compressed-data buffer, decompress them into the decompressed-data buffer, and flush them from memory.

The EAAVPreload function reads a caller-defined number of audio/video samples into the compressed-data buffer, starting at the current sample index. The EAAVPreload function also manipulates the samples as specified by a set of preload flags. If set, these flags have the following meanings:

PL_ENTIRE_FILE Read the entire audio/video clip from the file and store it in the compressed-data buffer.

PL_DECOMPRESS Decompress the preloaded video frames into the decompressed-data buffer.

PL_PERSISTENT Retain the preloaded audio/video samples in memory after playback (e.g., for subsequent playing).

After calling EAAVPreload, the clip is ready to play as soon as EAAVPlay is called.

Calling the EAAVPreload function before calling EAAVPlay is not necessary, but doing so may improve performance. In preloading, the audio/video object library causes one or more samples of audio/video data to be read from the file ahead of time (i.e., before the display mixer actually asks for the video data to be drawn) and (possibly) decompressed ahead of time to be ready for subsequent drawing to the surface. When the end of the current audio/video file is approaching, the application may elect to preload audio/video samples from the next audio/video file to provide a smooth transition between files.

The EAAVFlush function flushes any audio/video samples that were kept in memory because EAAVPreload was called with the PL_PERSISTENT flag set.

Preloading With Vector Tables

The previous section of the specification described how to preload individual audio/video clips. This section describes a generalization of that scenario: how to use vector tables for preloading a collection of audio/video clips in support of branching operations.

The media device manager 230 of FIG. 2 supports the use of vector tables. Vector tables provide the capability to preload one or more different sequences of audio/video frames that may correspond to different possible choices for the flow of an interactive video application. A vector table is an array of pointers to data structures. Each entry in a vector table corresponds to a sequence of frames in an audio/video clip. The vector table can be filled with entries corresponding to different sequences of frames from one or more audio/video clips.

Figure 7:
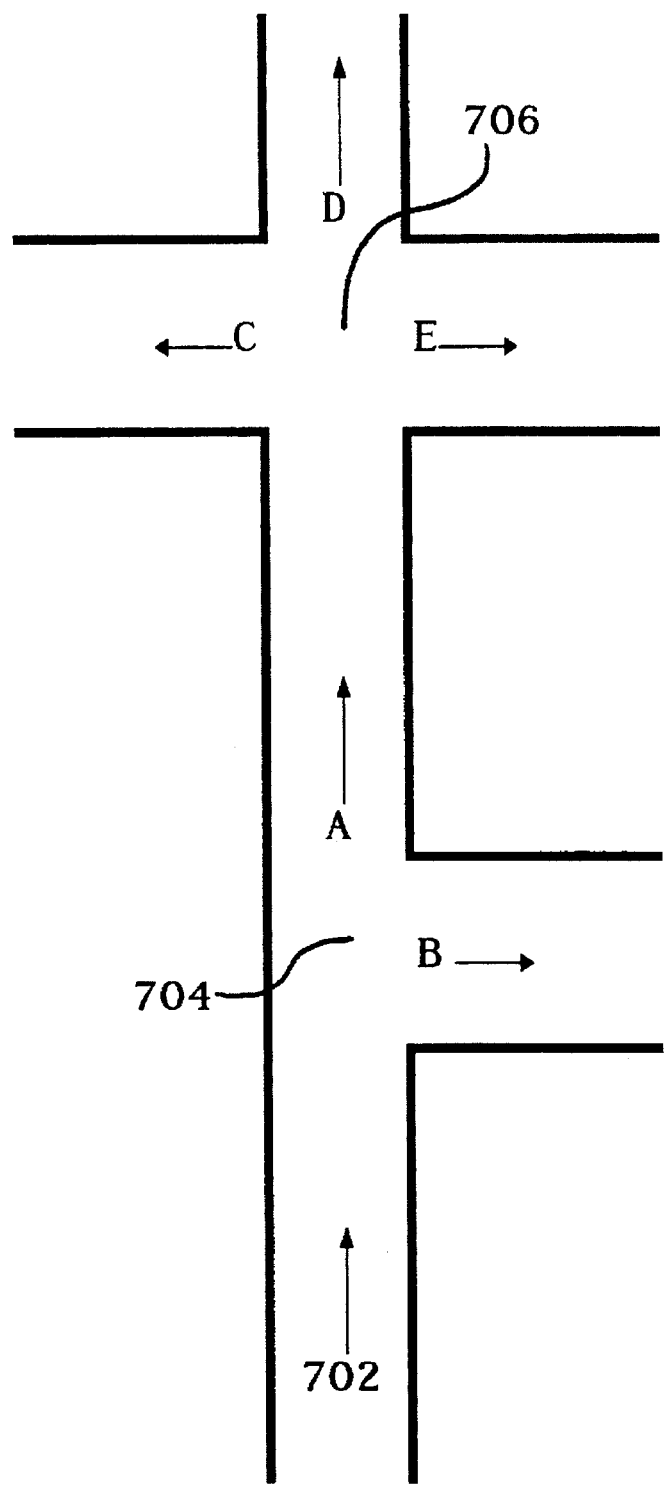
FIG. 7 shows a representation of the flow of an interactive video application for which a vector table may be used.

Referring now to FIG. 7, there is shown a representation of the flow of an interactive video application for which a vector table may be used. The application may simulate, for example, a person walking through a set of intersecting hallways and the application may cause video images to be displayed on the monitor that correspond to the views a person would have at different locations and directions in those hallways. When the user reaches intersection 704 from position 702, he may have the choice of proceeding in either direction A or direction B. Similarly, if direction A is selected, when the user reaches intersection 706, he may have the choice of proceeding in one of direction C, D, or E.

If the application waits until after the user makes his choices before beginning to read and decode the corresponding audio/video data from the audio/video file, there may be an undesirable delay in the display of the video images.

In order to provide for smooth transitions at hallway intersections, the application may elect to use vector tables. When the application recognizes that the user is approaching intersection 704 from direction 702, the application instructs the audio/video object library to create a vector table and fill two of its entries with the sequences of audio/video frames corresponding to directions A and B. This causes two sequences of audio/video frames to be preloaded—one for direction A and one for direction B. If, when the user reaches intersection 704, he selects direction A, the application instructs the audio/video object library to play the audio/video sequence corresponding to direction A and optionally flush the audio/video sequence for direction B.

Similarly, when the application recognizes that the user is approaching intersection 706 along direction A, the application instructs the audio/video object library to fill three of the vector table entries with sequences of audio/video frames corresponding to directions C, D, and E. Again, when the user finally reaches intersection 706, audio/video sequences for each of the three options will already be preloaded.

As a result, vector tables are a mechanism for providing smooth transitions when choices are made as to the flow of an interactive video application.

The application calls the EAAVCreateVectorTable function in the audio/video object library to create an empty vector table. The application specifies the maximum number of entries in the vector table and the audio/video object library returns the handle to the newly created vector table. The EAAVDeleteVectorTable function deletes a vector table.

The EAAVSetTableEntry function places a caller-defined audio/video clip and offset in a vector table entry and preloads the clip. The application specifies the handle to the vector table, a table entry number (selected by application), the handle to the audio/video clip to be preloaded, the position within the audio/video clip for the first frame of the table entry, the number of frames to preload, and other preload information.

The EAAVChooseTableEntry function begins playing the audio/video sequence that corresponds to a specified table entry. The application is responsible for saving the vector table handle and for keeping track of the various choices that correspond to the different vector table entries. The application is also responsible for recognizing which vector table entry is to be selected. After a choice made, the application calls EAAVChooseTableEntry to instruct the audio/video object library to play the audio/video clip corresponding to the selected vector table entry. As part of the EAAVChooseTableEntry call, the application indicates whether to flush the other vector table entries and clear the table.

The EAAVGetTableEntry function returns the handle to the audio/video clip associated with a specified vector table entry, and the offset into the audio/video clip corresponding to the first audio/video frame for the vector table entry. The EAAVClearTableEntry function clears an entry from a vector table and flushes the associated clip from memory. The EAAVClearVectorTable function clears an entire vector table and flushes all the associated audio/video clips from memory.

Surface/Attribute Functions

The surface/attribute manager 218 of FIG. 2 exports surface functions and attribute functions of API 204. Surface functions control surfaces to which objects are rendered. Attribute functions manipulate the attributes of objects. Attribute functions are generic functions that may be applied to any type of objects, including graphics objects and audio/video objects.

Surface Functions

API 204 of FIG. 2 provides the following surface functions:
EACreateSurface
EADeleteSurface
EASetSurfaceColor
EAGetSurfaceColor A surface is a destination for objects. A surface itself may be treated as an object. Multiple surfaces can be created. Each surface can have a draw order assigned to it, allowing the surfaces to be combined and displayed in a coherent manner.

Figure 8:
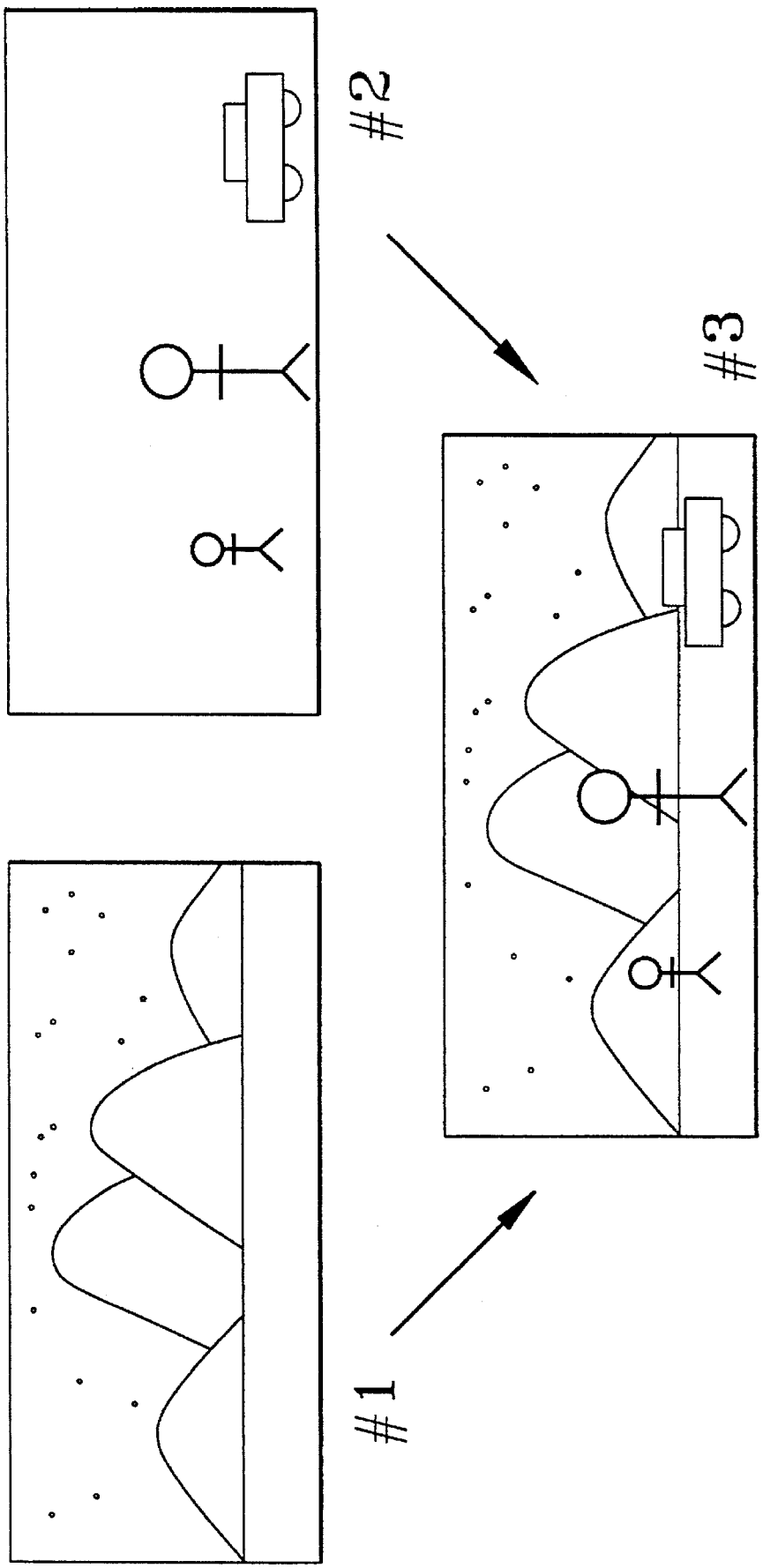
FIG. 8 shows an illustration of how two surfaces are combined onto another surface.

Referring now to FIG. 8, there is shown an illustration of how two surfaces are combined onto another surface. Surface #1 contains two backgrounds: the dark sky with stars and the foreground with mountain ranges. Surface #2 contains two stick-figure sprites and a car sprite. Surfaces #1 and #2 are combined onto surface #3, where the draw order of surface #2 specifies that surface #1 be drawn "behind" surface #2.

Surfaces are created using the EACreateSurface function. The application specifies the width, height, and pixel format of the surface. A default color can be specified for the surface using the EASetSurfaceColor function. In this case, any pixel not occupied by a graphical object will have the default color when the surface is rendered and drawn.

The EAGetSurfaceColor function returns the default color assigned to a specified surface. The EADeleteSurface function deletes a specified surface.

Attribute Functions

API 204 of FIG. 2 provides the following generic functions to manipulate the attributes of objects:
EASetDrawOrder
EAGetDrawOrder
EASetVisibility
EAGetVisibility
EASetPosition
EAGetPosition
EASetView
EAGetView
EASetDestination
EAGetDestination
EASetCurrentImage
EAGetCurrentImage
EAIncCurrentImage
EADecCurrentImage Computer system 100 of FIG. 1 provides a set of attributes for objects. These attributes control how each object is rendered. The EASetDestination function specifies the surface that is to be the destination for an object. The EASetPosition function specifies the location within the surface where the object is rendered. The upper left corner of the surface (i.e., the destination) is the point (0,0). The EASetView function specifies the portion of the object to be rendered. The EASetVisibility function shows or hides the object. An application calls the EASetDrawOrder function to specify the order in which an object is rendered to a specified surface.

The EAGetDestination function retrieves the current destination for a specified object. The EAGetPosition function retrieves the current position for a specified object. The EAGetView function returns the currently selected view for a specified object. The EAGetVisibility function retrieves the display state of a specified object. The EAGetDrawOrder function returns the draw order for a specified object.

The EASetCurrentImage function specifies which image in a sequenced object provides the current data for display. The EAGetCurrentImage function retrieves the index for image whose data was previously set to supply the current image. The EAIncCurrentImage function sets the current image by incrementing the sequence index. The EADecCurrentImage function sets the current image by decrementing the sequence index.

Meta-Functions

An application can manipulate objects in ways other than setting their attributes. These manipulations of objects are performed by use of meta-functions, which include render/draw functions, effect functions, and grouping functions. The meta-functions are exported by the surface/attribute manager 218 of FIG. 2.

Draw Function

API 204 of FIG. 2 provides the following function to draw objects:
EADraw

The EADraw function controls how and when objects and surfaces get drawn to their destinations. The EADraw function copies a specified completed surface to its final destination. Multiple surfaces can be combined to form another surface. Computer system 100 handles rendering of all dependent surfaces when a specified surface is rendered or drawn.

Effect Functions

API 204 of FIG. 2 provides the following effect functions:
EASetEffect
EAClearEffect
EAGetEffectStyles
EAGetEffectStyleParams Effects can be applied to any object that can be displayed (i.e., sprites, backgrounds, grids, tiles, and surfaces). Effects do not change the original object data; they only change the way the object gets rendered. Objects may have more than one effect active at a time. An effect is specified by a bit field. An application can reference only one effect per function call. However, the application can clear multiple effects at a time by bitwise OR'ing the appropriate symbols.

The EASetEffect function applies a specified effect to a specified object. The EAClearEffect function clears one or more effects that were applied to a specified object. The EAGetEffectStyles function returns the effects that are currently enabled for a specified object. The EAGetEffectStyleParams returns the currently set values for the specified effect.

The possible effects include, for example, the following:

Scale: Controls the size of an object. This function can scale up or down based on the size of the source rectangle specified when the object was created and the parameter in this function.

Rotate: Rotates an object around a specified point a specified number of degrees.

Flip: Flips an object left to right (xFlip) and/or top to bottom (yFlip).

Horizontal shear: Horizontally shifts, row by row, an object left (negative values) or right (positive values). Each value in the pTransArray corresponds to one row starting at the top of the object.

Vertical shear: Vertically shifts, column by column, an object up (negative values) or down (positive values). Each value in the pTransArray corresponds to one column starting at the left of the object.

App function Applies an application function that gets passed in the pAppFn parameter to an object.

Each effect requires a unique set of parameters which are passed using a structure. The parameters for each effect are as follows:

| Effect | Structure Name | Elements |
| --- | --- | --- |
| EA_SCALE | EA_SCALE_STRUCT | RECTL rScale |
| EA_ROTATE | EA_ROTATE_STRUCT | POINT RotationPt, int degrees |
| EA_FLIP | EA_FLIP_STRUCT | BOOL xFlip, BOOL yFlip |
| EA_HORIZ_SHEAR | EA_HORIZ_SHEAR_STRUCT | LPINT pTransArray, WORD numElements |
| EA_VERT_SHEAR | EA_VERT_SHEAR_STRUCT | LPINT pTransArray, WORD numElements |
| EA_APP_FN | EA_APP_FN_STRUCT | FARPROC pAppFn, LPVOID lpContext | where:
rScale is a scale factor;
RotationPt is a point about which to rotate;
degrees is an angle by which to rotate;
xFlip is a flag indicating whether to flip horizontally;
yFlip is a flag indicating whether to flip vertically
pTransArray is a one-dimensional array whose elements indicate how much to move the corresponding row or column;
numElements is the number of elements in pTransArray;
pAppFn is a pointer to the function to be called; and
lpContext is a handle that is provided by the application to provide the call function a mechanism by which it can know when and what module called it.

Grouping Functions

API 204 of FIG. 2 provides the following group functions:
EACreateGroup
EADeleteGroup
EAAddObjectToGroup
EARemoveObjectFromGroup
EAListObjectsInGroup
EAEnumObjectsInGroup
EAGetNumObjectsInGroup
EAGroupSetAttrib
EAGroupAdjustAttrib
EAGroupGetAttrib Grouping can be used when two or more objects are to have the same attribute changed. Any combination of sprites, backgrounds, and grids can be grouped together. A group acts as a command dispatcher, changing a given attribute for all its members. Not all attributes necessarily apply to all objects in a given group. For example, since a sprite's view is fixed, changing the view on a group that contains a sprite does not effect the sprite.

Only one variable of an attribute can be changed at a time. The attributes and their variables that can be changed using the group functions are as follows:

| Attribute | Variable Name (integer) |
| --- | --- |
| Position | PosX |
| | PosY |
| Draw order | DrawOrder |
| View | ViewTop |
| | ViewRight |
| | ViewWidth |
| | ViewHeight |
| Visibility | Visible |
| Current Image | FrameIndex |
| Rate | UpdateRate |

The EACreateGroup function creates a group and returns the handle for the group. The EADeleteGroup function deletes a specified group. The EAAddObjectToGroup function adds a specified objects to a specified group. The EARemoveObjectFromGroup function removes a specified object from a specified group. The EAListObjectsInGroup function returns a list of all of the objects that are members of a specified group. The EAEnumObjectsInGroup function calls an application-supplied callback function for each object that is a member of a specified group. The EAGetNumObjectsInGroup function returns the number of objects that are currently members of a group.

The EAGroupSetAttrib function sets the valspecifa specified attribute for all members of a specified group. The EAGroupAdjustAttrib function adjusts the value of a specified attribute by a specified delta from the current value for all members of a specified group. The EAGroupGetAttrib function returns the current value of a specified attribute for a specified group.

Scheduling Functions

The scheduling subsystem of computer system 100 supports scheduling functions, which include timer functions, event functions, and conditional functions. The scheduling functions are exported by the event scheduler 216 of FIG. 2.

Timer Functions

API 204 of FIG. 2 provides the following timer functions:
EACreateTimer
EADeleteTimer
EASetTimerFrequency
EAGetTimerFrequency
EAStartTimer
EAResetTimer
EAGetCurrentTimerTick
EASetCurrentTimerTick
EAStopTimer A timer is an object that permits the scheduling and synchronizing of activities. A timer is created using the EACreateTimer function, which returns a handle to the newly created timer. The EADeleteTimer function stops a timer if running and deletes the timer. The EASetTimerFrequency function sets the frequency of a specified timer. The EAGetTimerFrequency function returns the frequency values for a specified timer.

The EAStartTimer function starts a specified timer. The EAResetTimer function resets the timer tick value to zero. If the timer is running, it will continue to run. If the timer is stopped, just the timer tick count will change; the timer will not be started. The EAGetCurrentTimerTick function returns the current tick value for the specified timer. The EASetCurrentTimerTick function sets the current tick value for the specified timer. The EAStopTimer function stops a specified timer, but does not change the timer tick count.

Event Functions

Computer system 100 allows activities called events to be scheduled for later or even repeated execution. API 204 of FIG. 2 provides the following event functions:
EACreateEvent
EADeleteEvent EAScheduleEvent
EARepeatEvent
EAQueryEventStatus
EAGetEventRepeat
EAUpdateEventRepeat To schedule an activity, an event is first created using the EACreateEvent function. This function call returns a handle to the event. This handle can be used to refer to the event. The EADeleteEvent function deletes a specified event.

Once an event has been created it can be scheduled to occur at a specific time using the EAScheduleEvent function. This function call expects a handle to the event to be scheduled as well as the handle of the timer object to use to schedule the event.

A scheduled event can be made to occur repeatedly using the EARepeatEvent function. This function call is given the time period between repetitions in terms of timer ticks. The EARepeatEvent function can also be given the number of times that the repetition is to occur. If the wTimes parameter is 0, the event will be repeated infinitely until the event is deleted.

The EAQueryEventStatus function provides the current status of a specified event. The EAGetEventRepeat function retrieves the time period for a specified repeated event. The EAUpdateEventRepeat function updates a repeated event with a new period.

Events are identified by an event code. The SET_ATTRIB event can be used to set any generic attribute of an object. The first parameter specifies the object whose attribute must be set. SET_ATTRIB can operate on single as well as groups of objects. The second parameter identifies the attribute to be set. The third parameter is a modifier that can specify that the attribute be set to a RANDOM value or to an ABSOLUTE value. When ABSOLUTE is used as the modifier, the fourth parameter specifies the value to be used.

The ADJUST_ATTRIB event can be used to change any generic attribute of an object. ADJUST_ATTRIB applies an addend to the attribute (i.e.,+=operator is applied). The parameters are similar to those for the SET_ATTRIB event.

The SET_EFFECT event causes an event to be created that will set an effect. Its parameters are similar to those of the EASetEffect function call. Once an effect is set, its parameters can be modified by re-issuing the SET_EFFECT event.

The CLEAR_EFFECT event clears a specified event.

The DRAW event allows an event to be created. By calling the EARepeatEvent function on a DRAW event, the frequency with which the monitor display is to be refreshed can be set.

The CALLBACK event creates an event that will invoke a supplied function. By calling the EARepeatEvent function on a CALLBACK event, a periodic timer callback can be set. In addition to specifying the callback function itself, a second DWORD parameter may be provided as a parameter to be passed to the CallbackProc function. This allows the procedure to have a context when it is called.

An object library can define custom events that the event scheduler does not support. The EA_EVENT_USER event allows an object library to export events for its own objects that the event scheduler does not know about.

Conditional Functions

Conditional functions fall into two categories: conditional actions and constrained events.

Conditional Actions

During the course of scheduled activities, several error or notification conditions may arise. Computer system 100 allows a variety of actions to be enabled to respond to such conditions. API 204 of FIG. 2 provides the following conditional action functions:

EASetConditionalAction
EAGetConditionalAction
EAClearCondition
EASetConditionalCallback
EAGetConditionalCallback Conditions and actions are set using the EASetConditionalAction function. Computer system 100 allows for the specification of a callback function to be invoked in response to a condition. (Note that setting a simple periodic callback function may be performed using the EACreateEvent, EAScheduleEvent, and EARepeatEvent functions.) Conditional callbacks are set with the EASetConditionalCallback function.

The EAGetConditionalAction function retrieves the action associated with a specified action. The EAClearCondition function clears an action that was previously specified to occur in response to a specified condition. The EAGetConditionalCallback function retrieves the callback function associated with a specified condition.

Conditions upon which callbacks can be set are: LOSS_OF_FOCUS, RETURN_OF_FOCUS, and FALL_BEHIND. Actions that can be taken when these conditions are met are: PAUSE, IGNORE, and CONTINUE. The LOSS_OF_FOCUS condition occurs when a player has activated an application different from application 202 of FIG. 2. The RETURN_OF_FOCUS condition occurs when a player has returned to application 202. The FALL_BEHIND condition occurs when computer system 100 is overloaded and cannot keep up with the rendering demands. The PAUSE action temporarily stops the event timer for surfaces associated with application 202. The CONTINUE action restarts a previously stopped event timer. The IGNORE action is a null action in which no action is taken.

Constrained Events

In addition to conditional actions, computer system 100 also allows constraining conditions to be imposed on events. For example, constraints can be set on ADJUST_ATTRIB scheduled events. Constraints can also be set to limit the random value generated for either SET_ATTRIB or ADJUST_ATTRIB events. API 204 of FIG. 2 provides the following constrained event functions:

EASetAdjustConstraint
EAGetAdjustConstraint
EAClearConstraint
EASetConstraintCallback
EAGetConstraintCallback Constraints are set with the EASetAdjustConstraint function. A parameter to this function identifies whether the EA_ADJUSTBOUNDS or the EA_RANDOMNESS is to be constrained.

EA_ADJUSTBOUNDS refers to setting bounds on the result of an ADJUST_ATTRIB event. Minimum and maximum bound values are specified as parameters. When the result overflows the specified bounds, either a EA_BOUNCE or a EA_CYCLE operator can be applied to the scheduled event. Applying a EA_BOUNCE operator reverses the sign of the ADJUST_ATTRIB addend. This is equivalent to the object bouncing back from a wall (i.e., the bound). The EA_CYCLE operator applies a modulo function to the result of the ADJUST_ATTRIB, but the addend itself is not disturbed.

EA_RANDOMNESS refers to constraining the random value applied during an ADJUST_ATTRIB event. Minimum and maximum values of bounds are specified as parameters. An ADJUST_ATTRIB event with a EA_RANDOM modifier can have constraints set on both its EA_RANDOMNESS and its EA_ADJUSTBOUNDS.

Computer system 100 allows for the specification of a callback function to be invoked to manage an event. Event management callbacks are set with the EASetConstraint-Callback function. The EAGetAdjustConstraint function retrieves parameters for the constraining conditions that were imposed on an event. The EAClearConstraint function clears a previously set constraint. The EAGetConstraintCallback retrieves the callback function associated with a specified event condition.

Event conditions upon which callbacks can be set are: EVENT_COMPLETE, ADJUST_ATTRIB, and ADJUST_OVERFLOW. The EVENT_COMPLETE condition occurs when a specified scheduled event is completed. The ADJUST_ATTRIB condition occurs when a specified object's attribute is adjusted. By creating the original event with an absolute addend of zero, a function can apply a non-standard adjustment to an attribute. The ADJUST_OVERFLOW condition occurs when an overflow of specified bounds occurs when a specified object's attribute is adjusted. Using this condition, an object can be manipulated when it moves past specified bounds.

Audio Functions

Those skilled in the art will understand that them exist audio managers that export audio APIs which can be appropriately modified and integrated into the computer system of the present invention to provide and support audio functionality that can be synchronized with the other functionalities provided by the computer system. In a preferred embodiment, the audio manager uses the event scheduler via the event coordination API to schedule and coordinate audio activities with the other activities of the computer system.

Communications Functions

Those skilled in the art will understand that a comm manager can be designed for the computer system of the present invention to provide the capability of communicating over a network or other communications link with similar computer systems residing in other nodes. It will be further understood that remote procedure call capabilities can be designed into that comm manager to provide the ability to invoke the remote computer system's API functions. This may provide the capability, for example, for two or more users of remote computer systems to play along side each other or against each other in the same interactive game.

Service Provider Interface

Display mixer SPI 228 of FIG. 2 defines a set of functions called by object libraries 222–226 to control the operations of display mixer 220. The display mixer SPI functions are exported by the display mixer 220 of FIG. 2. The display mixer SPI functions include the following:
EACreateObject
EADeleteObject
EASetDrawFunction
EASetMsgFunction
EASetWidth
EAGetWidth
EASetHeight
EAGetHeight The display mixer SPI functions are defined in further detail later in Appendix B of this specification.

An object library calls the EACreateObject function to tell the display mixer to create an object. The display mixer returns a handle for the newly created object. When the EACreateObject function is called, the attributes that are valid for that object are specified in a DWORD bitfield called dwValidAttribs, which has the following bits defined:

| Bit  | Name            | Attribute   |
|------|-----------------|-------------|
| 0x01 | VA_DRAW_ORDER   | Draw Order  |
| 0x02 | VA_VISIBILITY   | Visibility  |
| 0x04 | VA_POSITION     | Position    |
| 0x08 | VA_VIEW         | View        |
| 0x10 | VA_SEQUENCED    | Sequenced   |
| 0x11 | VA_DESTINATION  | Destination |

The display mixer saves these bits to determine which attribute functions are permitted for that object. In addition, when the EACreateObject function is called, default values for the attributes may be assigned using a DEFAULT_ATTRIBS structure, which is defined as follows:

```
typedef struct
{
    DWORD dwDrawOrder;      // draw order
    BOOL  bVisibility;      // visibility
    long  lPosX;            // x position for the object on the surface
    long  lPosY;            // y position for the object on the surface
    long  lViewX;           // left edge of the view within the object
    long  lViewDX;          // width of the view of the object
    long  lViewY;           // top edge of the view within the object
    long  lViewDY;          // height of the view within the object
    long  lSeqSize;         // number of images in sequenced object (1 for non-sequenced
                            //   objects)
} DEFAULT_ATTRIBS;
```

The EADeleteObject function tells the display mixer to delete a specified object.

An object library calls the EASetDrawFunction function to pass to the display mixer a pointer to the draw function for that object library. The display mixer saves this draw function pointer for future use, along with similar draw function pointers for all of the other object libraries. When the application calls the EADraw function into the surface/attribute manager, the display mixer uses the draw function pointers to instruct the object libraries to draw their objects to the surface. The display mixer determines the sequence for instructing the object libraries to draw the objects based on the relative draw order values assigned to the objects.

When it is time for objects to be drawn to a surface, the application calls the EADraw function into the surface/attribute manager. In response, the display mixer instructs the object libraries to draw their objects to the surface. When the display mixer instructs an object library to draw its object, the display mixer uses an EADRAW_PARAMS structure to pass draw parameters to the object library forcontrolling the drawing of the object. The EADRAW_PARAMS structure is defined as follows:

instructs the display mixer to return the height of the specified object to the object library.

```
typedef struct
{
    long lTime;              // time to be used by object library to select image to draw (for
                             those object libraries that select images based on time)
    long lSeqIndex;          // index for a sequenced object, to be used by object library to
                             select image to be drawn (for those object libraries that select
                             images based on sequence index)
    RECTWH rwhSurfView;      // dimensions of the surface to which to draw object (used for
                             clipping to ensure that objects are not drawn off the edges of the
                             surface)
    POINTL ptlObjPos;        // location within surface to which to draw object
    RECTWH rwhObjView;       // view within object to draw
    WORD wDstSel;            // selector for the memory where the object is to be drawn
    WORD wAlign;             // dummy variable space to ensure DWORD alignment of
                             subsequent fields
    DWORD dwDstOff;          // offset for the memory where the object is to be drawn
    long lStride;            // distance in bytes in the memory between vertically adjacent
                             pixels
    DWORD dwBitCount;        // number of bits per pixel on the surface
} EADRAW_PARAMS;
```

An object library calls the EASetMsgFunction function to pass to the display mixer a pointer to a function which can be used to turn on and off effects that are to be applied to an object of that object library. The display mixer saves this message function pointer for future use, along with similar message function pointers for other object libraries. EASetMsgFunction is also used to install and execute any object-specific event that the application may create using the EACreateEvent function. Object-specific events are events not recognized by the display mixer as one of the generic events.

When an application wants an effect applied to an object, the application calls the EASetEffect function into the surface/attribute manager. In response, the display mixer uses the saved message function pointer to instruct the object library to apply the appropriate effect to the object before drawing the object to the surface. When the display mixer calls the saved message function, it identifies the object and the effect to be applied. The display mixer also passes a message value and a pointer to an unspecified structure. The message value is one of the following values:

Relationships Between API and Display Mixer SPI Functions

For some API functions, when the application calls an API function into an object library, the object library responds by calling one or more display mixer SPI functions into the display mixer. For example, when an application calls the EACreateSprite function into the graphics object library, the graphics object library calls the EACreateObject function into the display mixer.

Similarly, for other API functions, when the application calls an API function into the surface/attribute manager, the display mixer responds by calling one or more display mixer SPI functions into the appropriate object library. For example, when the application calls the EADraw function into the surface/attribute manager, the display mixer responds by sequentially calling the draw functions for one or more object libraries to draw their objects to the surface.

For still other API functions, when the application calls an API function into an object library, the object library calls other API functions into the event scheduler. For example, when the application calls the EAAVPlay function into the

| | | |
|---|---|---|
| EA_EFFECT_SET | 1 | // tells object library to apply the effect on the object |
| EA_EFFECT_SET_ORDER | 2 | // indicates that the unspecified structure contains a value to be used by the object library to determine the order in which the effect is applied to the object |
| EA_EFFECT_SET_PARAMS | 3 | // indicates that the unspecified structure contains one or more new paramter values for the effect |
| EA_EFFECT_GET_ORDER | 4 | // indicates that the current order for the effect is to be returned to the display mixer in the unspecified structure |
| EA_EFFECT_GET_PARAMS | 5 | // indicates that the current parameters for the effect are to be returned to the display mixer in the unspecified structure |
| EA_EFFECT_CLEAR | 6 | // tells object library to stop applying the effect on the object |
| EA_EFFECT_QUERY | 7 | // asks the object library whether the object library supports the effect |

An object library calls the EASetWidth function to instruct the display mixer to set the width of the specified object to the specified width. The EAGetWidth function instructs the display mixer to return the width of the specified object to the object library. The EASetHeight function instructs the display mixer to set the height of the specified object to the specified height. The EAGetHeight function audio/video object library, the audio/video object library calls the EAScheduleEvent and EARepeatEvent functions into the event scheduler.

These relationships and those for other functions are described in described in Appendices A and B of this specification.

System Operations

Figure 9:
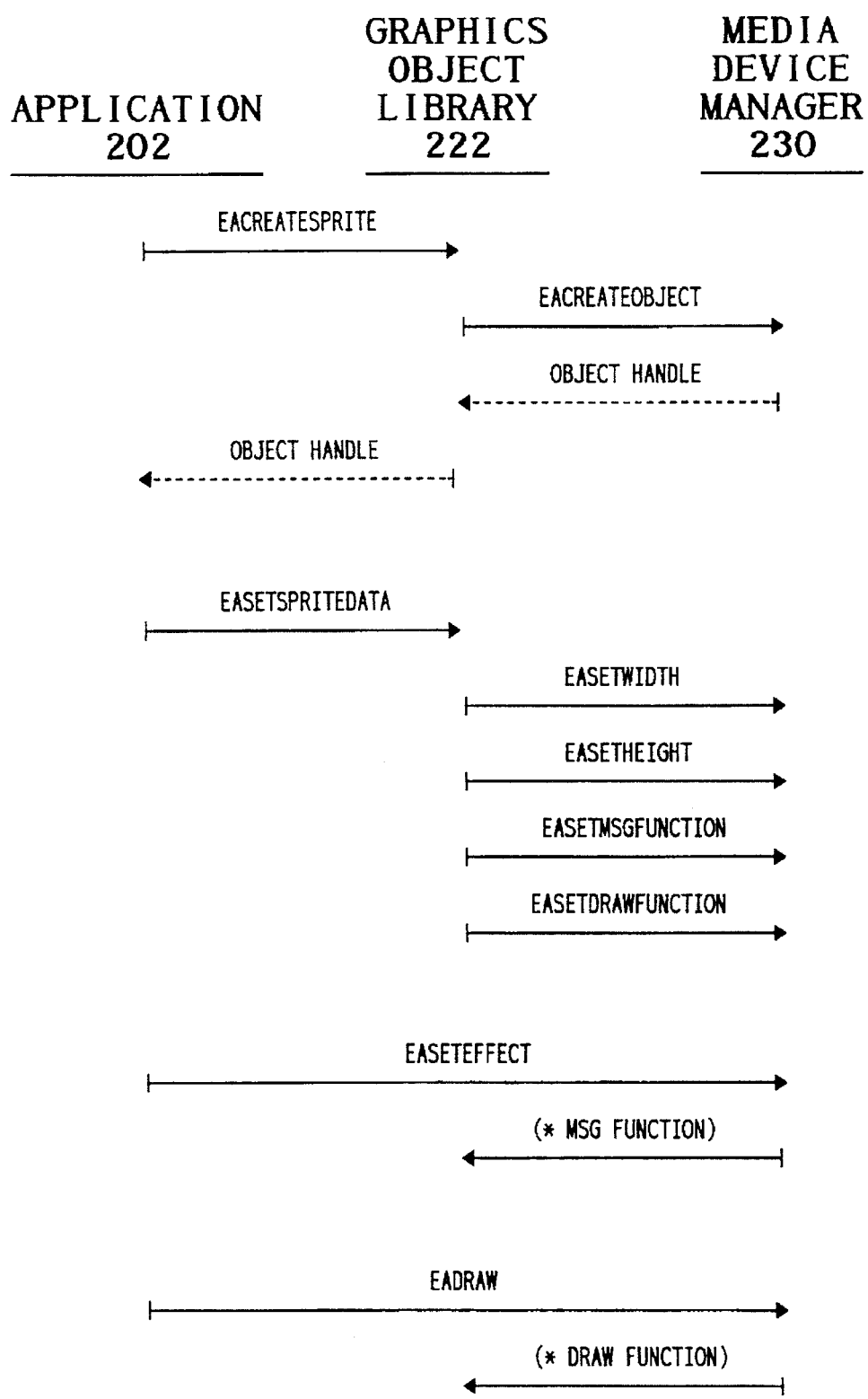
FIG. 9 shows an example of the API and SPI function calls for creating and displaying a sprite in a window on a monitor.

Referring now to FIG. 9, there is shown an example of the API and display mixer SPI function calls for creating and displaying a sprite in a window on a monitor. Application 202 of FIG. 2 creates a sprite by calling the EACreateSprite API function into graphics object library 222 of FIG. 2. In response, the graphics object library calls the EACreateObject SPI function into the display mixer of media device manager 230 of FIG. 2. The display mixer creates the desired object and passes the object handle back to the graphics object library, which in turn passes the object handle for the sprite back to the application.

The application sets the data for the newly created sprite by calling the EASetSpriteData API function into the graphics object library. In response, the graphics object library sequentially calls four SPI functions (EASetWidth, EASetHeight, EASetMsgFunction, and EASetDrawFunction) into the display mixer. The graphics object library calls the EASetWidth and EASetHeight functions into the display mixer to set the width and height of the newly created sprite, respectively. The graphics object library calls the EASetMsgFunction into the display mixer to inform the display mixer of the pointer to the library's message function. Similarly, the graphics object library calls the EASetDrawFunction into the display mixer to inform the display mixer of the pointer to the library's draw function.

To apply an effect to the sprite object, the application calls the EASetEffect API function into the surface/attribute manager of media device manager 230. In response, the display mixer uses the saved message function pointer to call the function into the graphics display library that sets the effect.

To draw the sprite object (with the effect applied) to the monitor, the application calls the EADraw API function into the surface/attribute manager. In response, the display mixer uses the saved draw function pointer to call the function into the graphics display library that draws the object to the surface for display in a window on the monitor.

Software Implementation

Flexible Architecture

Media device manager 230 of FIG. 2 and its associated API 204 and display mixer SPI 228 provide an infrastructure that can support a wide variety of computer operations. For example, as described above, application 202 may be a computer game application and object libraries 222-226 may include graphics and audio/video object libraries that provide graphics and audio/video data to be displayed as part of the computer game. In general, the infrastructure of the present invention supports any application that uses API 204. For example, application 202 may be a computer game application, an encyclopedia application, an interactive video application, an audio/video conferencing application, or an audio/video broadcast application.

Moreover, the infrastructure of the present invention is expandable in that custom object libraries and effects can be added to the system software architecture of FIG. 2. This is enabled by the existence of display mixer SPI 228 which allows the custom object libraries and effects to be added between an application 202 and display mixer 220. The custom object libraries may also export API functions in addition to or other than those defined for API 204 so long as the additional API functions are supported by application 202. Object libraries 222-226 may include, for example, object libraries for two-dimensional graphics, audio/video, three-dimensional graphics, vibrations and other mechanism motions, or even smells and tastes.

Another flexible feature of the infrastructure of the present invention relates to hardware scalability. Hardware scalability refers to the ability of computer systems of the present invention to implement certain functions either (1) with software running on the host processor or (2) using peripheral hardware components. For example, by using separate hardware to perform an effect such as scaling (i.e., increasing or decreasing the size of a bitmap), the processing bandwidth of the computer system may be increased.

In one embodiment, the media device manager determines the presence of such peripheral hardware components by interrogating to determine what hardware and software components are configured in the system. The media device manager may then perform profiling (i.e., off-line processing of test images using different configurations of the available hardware and software components) to determine which configuration provides optimal performance for use during real-time processing. The particular configuration that provides optimal performance is then used during real-time processing.

This hardware scalability of computer systems of the present invention is transparent to the application programmer. The computer system decides which configuration to use and then communicates with the selected hardware in a manner that is transparent to the application program and thus transparent to the application programmer, as well. This removes the device-dependency burden from the application programmer and provides hardware functionality at no additional programming cost.

API-Initiated Run-Time Inheritance

The object libraries export API functions that support the creation and manipulation of objects. The application calls one of these API functions into a particular object library to create a particular type of object. For example, the application may call the EACreateSprite function into a graphics object library to create a sprite.

In response, the object library calls the EACreateObject display mixer SPI function into the display mixer to create a generic object. In doing so, the object library passes to the display mixer a set of parameters specifying the initial values for the generic attributes for that object. The generic attributes are the types of object attributes that the display mixer knows about. The object library also passes to the display mixer a parameter called dwExtraBytes. When the display mixer creates the generic object for the object library, the display mixer allocates a block of memory for the generic attributes. The display mixer also allocates extra bytes in that same memory space corresponding to the value of the dwExtraBytes parameter.

The display mixer returns to the object library a handle to the newly created generic object. The handle is actually a pointer to the beginning of the extra bytes in the memory space that the display mixer allocated for that object. When any module subsequently calls an API function into the media device manager to operate on that object, the module identifies the object by the handle. The media device manager knows how to convert the handle (i.e., the pointer to the extra bytes) into a pointer to the beginning of the memory space allocated for that object in order to manipulate the generic attributes for the object.

Using the handle, the object library can directly access the extra bytes of the memory space allocated for the object. The object library can use these extra bytes of memory space for purposes about which the media device manager is unaware. For example, when the application asks a graphics object library to create a sprite, the graphics object library can use the extra bytes to store those attributes of the sprite that differentiate a sprite from other objects.

This scheme of function calls and memory space allocation may be called API-initiated run-time inheritance. API-initiated run-time inheritance refers to the notion that when the application asks an object library to create a specific type of object (e.g., a sprite) at run time, the object library asks the display mixer to create a generic object. The object library then adds additional attributes and functionality to create the specific type of object from the generic object. The object library's specific object inherits all of the attributes and functionality of the display mixer's generic object. In addition, the specific object also has the specific attributes and functionality that the object library added to the generic object. The media device manager remains responsible for performing all the generic operations to manipulate the generic attributes of the specific object.

This API-initiated run-time inheritance of the present invention differs from other prior-art methods of achieving inheritance. Under a first prior-art method, the application declares a variable of the type corresponding to the derived object (i.e., the specific object). The derived object contains (1) the base object (i.e., the generic object) and (2) the information and functionality added to the base object to make the derived object. The inheritance from the base object to the derived object is established when the derived object is compiled. At application compile time, the compiler allocates enough space for the derived object. At run time, the application can use the derived object and all its functionality.

Under a second prior-art method, the application declares a pointer of the type for the derived object. The inheritance from the base object to the derived object is established at the derived object compile time. At application compile time, the compiler allocates enough space for the pointer only. At run time, the application has to ensure that the pointer is actually pointing to an instance of the derived object. The application accomplishes this by either (1) setting the pointer to the address of another instance of the derived object or (2) having the operating system allocate enough memory to hold an instance of the derived object.

The API initiated run-time inheritance of the present invention has advantages over the compile-time inheritance of the first and second prior-art methods. With compile-time inheritance, the programmer (i.e., software developer) of the derived object needs a header file describing the data and functions that the base object exports so that they can be passed on to the application developer as part of the required header file for the derived object. With run-time inheritance, on the other hand, the derived object needs only a few simple functions to create and delete the base object. In turn, the derived object can then export similar simple functions to the application to create and delete the derived object.

Run-time inheritance provides at least the two important advantages over compile-time inheritance. First, run-time inheritance more completely encapsulates the implementation of the base object from the derived object and more completely encapsulates the implementation of the derived object from the application. This reduces the amount of information that the developer of an application needs to know about the derived object (i.e., in the object library) and the base object (i.e., in the display mixer). It also reduces the amount of information that the developer of an object library needs to know about the base object (i.e., in the display mixer).

A second important advantage of run-time inheritance over compile-time inheritance is that, since the functions to create derived and generic objects are only called when they are needed, the memory associated with the objects only needs to be present during the time that the object is actually needed. The actual inheritance only happens at run time when the derived object is needed, instead of being inherited at compile time and always present whether it is needed or not. As a result, the total memory requirements and average memory requirements can be reduced.

The API-initiated run-time inheritance of the present invention also differs from a third prior-art method of achieving inheritance, albeit run-time inheritance. Under an MSW operating system, an application can ask the operating system to create a window and to allocate extra memory space associated with that window. If the application wants to access that extra memory space to store and retrieve information, it must call specific MSW API functions. Moreover, the application cannot define a data structure for that memory space to gain symbolic access to that memory space.

This is not the case with the API-initiated run-time inheritance of the present invention, wherein the object library has direct access to the extra bytes allocated by the display mixer using the handle (i.e., pointer) returned by the display mixer to the object library. That is, the object library can access the extra bytes without going through the display mixer. In fact, the object library is free to define whatever data structure it wants for those extra bytes, thereby gaining symbolic access to that memory space. Those skilled in the art will understand that these are significant advantages of the API-initiated run-time inheritance of the present invention over the the MSW operating se provided by the MSW operating system.

It will be further understood that various changes in the details, materials, and arrangements of the parts which have been described and illustrated in order to explain the nature of this invention may be made by those skilled in the art without departing from the principle and scope of the invention as expressed in the following claims.

Appendix A: Application Program Interface Functions

This appendix contains the definitions of the functions of API 204 of FIG. 2. The following are definitions of prefixes used for parameters for these functions:

b Boolean. A non-zero value indicates TRUE, a zero value indicates FALSE.

dw Long (32-bit) unsigned integer.

h Handle.

lp Far pointer.

lph Far pointer to a handle.

w Short (16-bit) unsigned integer.

EACreateBitmap

The EACreateBitmap function creates a bitmap, which can be used to compose a sprite, background, or tile. If the function is successful, a handle is returned. All subsequent references to the created bitmap are made using the returned handle. Every created bitmap should be deleted when it is no longer needed. This is an API function exported by a graphics object library. In response to this function call, the graphics object library calls the EACreateObject function into the display mixer.

Parameters(s):

| | |
|---|---|
| DWORD dwWidth | // bitmap width in pixels |
| DWORD dwHeight | // bitmap height in pixels |
| DWORD dwColorType | // format of bitmap data |
| DWORD dwBitCount | // bit depth of format |
| DWORD dwMask[4] | // nonstandard RGB formats |
| LPHEABMP lphEABmp | // pointer to the created bitmap |

| Return(s): | |
|---|---|
| EA_OK | // function succeeded, handle of the created bitmap is returned in LPHEABMP |
| EA_OUT_OF_MEMORY | // function failed due to insufficient memory |

EADeleteBitmap

The EADeleteBitmap deletes a bitmap that was previously created using the EACreateBitmap function. All created bitmaps should deleted when they are no longer needed. This is an API function exported by a graphics object library. In response to this function call, the graphics object library calls the EADeleteObject function into the display mixer.

| Parameter(s): | |
|---|---|
| HEABMP hEABmp | // bitmap handle |
| Return(s): | |
| EA_OK | // function succeeded |
| EA_FAILED | // function failed |

EALoadBitmap

The EALoadBitmap function fills the bitmap with graphical data obtained from a specified file. It is the responsibility of application 202 to ensure that the bitmap has enough space to hold all the data bounded by the rSrc region. This is an API function exported by a graphics object library. In response to this function call, the graphics object library may call the EASetBitmapBits function into the graphics object library.

EAGetBitmapBits

The EAGetBitmapBits function retrieves data from the specified bitmap bounded by rSrc and copies the data into the destination pointed to by hpBits. It is the responsibility of application 202 to ensure that there is enough room in the destination to hold all of the copied data. This is an API function exported by a graphics object library.

| Parameters(s): | |
|---|---|
| HEABMP hEABmp | // handle of bitmap object |
| POINTL ptl | // (x,y) coordinate of the bitmap corresponding to the upper left hand corner of the source rectangle |
| LPSTR lpFilename | // specified file |
| RECTL rSrc | // rectangular area from which the source data are obtained |
| Return(s): | |
| EA_OK | // successful return |
| EA_FAILED | // function failed |
| EA_OUT_OF_MEMORY | // function failed, insufficient memory to load file |

EASetBitmapBits

The EASetBitmapBits function fills a bitmap with the data pointed to by hpBits. It is the responsibility of application 202 to ensure that the bitmap is large enough to hold all the data bounded by rSrc. This is an API function exported by a graphics object library.

| Parameters(s): | |
|---|---|
| HEABMP hEABmp | // handle of bitmap object |
| POINTL DstPtl | // (x,y) coordinate of the bitmap corresponding to the upper left hand corner of the source rectangle |
| BYTE _huge * hpBits | // pointer to the data |
| RECTL rSrc | // rectangular area from which the source data are obtained |
| DWORD dwStride | // stride of hpBits in bytes |
| Return(s): | |
| EA_OK | // successful return |
| EA_FAILED | // function failed |

```
Parameter(s):
    BYTE _huge * hpBits    //pointer to the destination
    POINTL DstPtl          // rectangular area within the destination for the retrieved data
    DWORD dwStride         // stride of hpBits in bytes
    HEABMP hEABmp          // handle of bitmap object
    RECTL rSrc             // rectangular area in the bitmap where the data are retrieved from
Return(s):
    EA_OK                  // successful return
    EA_FAILED              // function failed
```

EAGetBitmapPointer

The EAGetBitmapPointer function retrieves the selector and offset corresponding to the specified bitmap. This is an API function exported by a graphics object library.

```
Parameter(s):
    HEABMP hEABmp          // handle to bitmap object
    LPWORD lpwSel          // selector of bitmap object
    LPDWORD lpdwOffset     // offset of bitmap object
Return(s):
    EA_OK                  // function succeeded, selector and offset of bitmap returned
    EA_FAILED              // function failed
```

EASetBitmapTransparency

The EASetBitmapTransparency function specifies how transparency is represented in a bitmap object. The transparency information consists of a style and a value for the style. Styles are defined as follows:

EATS_PALETTE_KEY—for palettized bitmap objects

EATS_COLOR_KEY—for non-palettized bitmap objects

EATS_BITMAP—handle to a bitmap

EATS_NONE—bitmap has no transparency

Transparency values for EATS_PALETTE_KEY range from 0 to 255. Transparency values for EATS_COLOR_KEY are the color values to be used to denote transparency. Transparency values for EATS_BITMAP contains a handle to a bitmap. This is an API function exported by a graphics object library.

```
Parameter(s):
    HEABMP hEABmp          // handle to bitmap object
    TSTYLE tStyle          // transparency style
    TRANSP Transp          // transparency value
Return(s):
    EA_OK                  // function succeeded
    EA_FAILED              // function failed
    EA_UNKNOWN_TSTYLE      // function failed because the transparency style is invalid
```

EAGetBitmapTransparency

The EAGetBitmapTransparency function returns transparency information for the specified bitmap object. This transparency information is that which was set via a previous EASetBitmapTransparency call. If no transparency was set prior to this call, this function returns an error. This is an API function exported by a graphics object library.

| Parameter(s): | |
|---|---|
| HEABMP hEABmp | // handle to bitmap object |
| LPTSTYLE lptStyle | // transparency style |
| LPTRANSP lpTransp | // transparency value |
| Return(s): | |
| EA_OK | // function succeeded, style and value are returned properly |
| EA_FAILED | // function failed |

EACreateSprite

The EACreateSprite function creates a sprite whose size and data format are determined strictly by the bitmap of graphical data for the sprite. All created sprites should be deleted when they are no longer needed. This is an API function exported by a graphics object library. In response to this function call, the graphics object library calls the EACreateSequencedSprite function into the graphics object library with number of bitmaps set to 1.

| Parameter(s): | |
|---|---|
| LPHSPR lphSpr | // pointer to handle of created sprite |
| Return(s): | |
| EA_OK | // function succeeded, a pointer pointing to the created sprite handle is returned |
| EA_FAILED | // function failed |

EADeleteSprite

The EADeleteSprite function deletes a created sprite. All created sprites should be deleted when they are no longer needed. This is an API function exported by a graphics object library. In response to this function call, the graphics object library calls the EADeleteObject function into the display mixer.

| Parameter(s): | |
|---|---|
| HSPR hSpr | // handle of sprite object to be deleted |
| Return(s): | |
| EA_OK | // function succeeded |
| EA_FAILED | // function failed |

EASetSpriteData

The EASetSpriteData function provides the created sprite with graphical data retrieved from the specified bitmap. It is the responsibility of application 202 to ensure that the bitmap has valid data loaded and the proper transparency information set prior to this call. If the sprite was sequenced, the EASetSequencedSpriteData function must be used instead. This is an API function exported by a graphics object library. In response to this function call, the graphics object library calls the EASetSequencedSpriteData function into the graphics object library with the number of bitmaps set to 1.

| Parameter(s): | |
|---|---|
| HSPR hSpr | // handle of sprite |
| HEABMP hEABmp | // handle of bitmap of data |

-continued

| Return(s): | |
|---|---|
| EA_OK | // function succeeded |
| EA_FAILED | // function failed |

EAGetSpriteData

The EAGetSpriteData function retrieves the data set for a sprite. This function retrieves the bitmap handle of the data for the specified sprite object. The sprite data must have been set with a prior EASetSpriteData call. For sequenced sprites, this call should not be used to get the data. This is an API function exported by a graphics object library. In response to this function call, the graphics object library calls the EAGetSequencedSpriteData function into the graphics object library with the number of bitmaps set to 1.

| Parameter(s): | |
|---|---|
| HSPR hSpr | // handle to sprite |
| LPHEABMP lphEAbmp | // pointer to handle of bitmap of data |
| Return(s): | |
| EA_OK | // function succeeded, handle of bitmap returned properly |
| EA_FAILED | // function failed |

EACreate Sequenced Sprite

The EACreateSequencedSprite function creates a sequenced sprite, specifying that the sprite's graphical data is a series of bitmaps. This function prepares the sprite object to receive a series of bitmaps as graphical data. The number of bitmaps must be greater than one. The bitmaps must be of equal size. This is an API function exported by a graphics object library. In response to this function call, the graphics object library calls the EACreateObject function into the display mixer.

Parameter(s):
| | |
|---|---|
| LPHSPR lphSpr | // pointer to handle of created sequenced sprite |
| WORD wNumBmps | // number of bitmaps of data for the sprite, this number must be greater than one |

Return(s):
| | |
|---|---|
| EA_OK | // function succeeded |
| EA_FAILED | // function failed |

EASetSequenced Sprite Data

The EASetSequencedSpriteData function supplies bitmap data to a sprite that was previously sequenced. This function provides the sequenced sprite with graphical data retrieved from the specified bitmap object. it is the responsibility of application 202 to ensure that the bitmap has valid data loaded and the proper transparency information set prior to this call. It is also the responsibility of application 202 to ensure that the sprite is sequenced and that the specified index is within the range of 0 to wNumBmps-1. This is an API function exported by a graphics object library. In response to this function call, the graphics object library calls the EASetMsgFunction, EASetDrawFunction, EASetWidth, and EASetHeight functions into the display mixer.

Parameter(s):
| | |
|---|---|
| HSPR hSpr | // handle to sequenced sprite |
| HEABMP hEABmp | // handle to bitmap of data |
| WORD index | // sequence index |

Return(s):
| | |
|---|---|
| EA_OK | // function succeeded |
| EA_FAILED | // function failed |
| EA_DIFFERENT_BMPS | // function failed because bitmap is not the same as those previously set for this sprite |

EAGetSequencedSpriteData

The EAGetSequencedSpriteData function retrieves the data set for a sequenced sprite via a previous EASetSequencedSpriteData call. This function retrieves the bitmap handle of data for the specified sequenced sprite. The sprite data must have been set with a prior EASetSequencedSpriteData call. It is the responsibility of application 202 to ensure that the index is within the range of 0 to wNumBmps-1. This is an API function exported by a graphics object library.

Parameter(s):
| | |
|---|---|
| HSPR hSpr | // handle to sprite |
| LPHEABMP lphEAbmp | // pointer to handle of bitmap of data |
| WORD index | // sequence index |

Return(s):
| | |
|---|---|
| EA_OK | // function succeeded, handle of bitmap returned properly |
| EA_FAILED | // function failed |

EACreateBackground

The EACreateBackground function creates a background object whose size and data format are determined strictly by the bitmap of graphical data. All created backgrounds should be deleted when they are no longer needed. This is an API function exported by a graphics object library. In response to this function call, the graphics object library calls the EACreateSequencedBackground function into the graphics object library with the number of bitmaps set to 1.

| | |
|---|---|
| Parameter(s): | |
|    LPHBKG lphBkg | // pointer to handle of created background |
| Return(s): | |
|    EA_OK | // function succeeded, a pointer pointing to the created background is returned |
|    EA_FAILED | // function failed |

EADeleteBackground

The EADeleteBackground function deletes a created background. All created backgrounds should be deleted when they are no longer needed. This is an API function exported by a graphics object library. In response to this function call, the graphics object library calls the EADeleteObject function into the display mixer.

| | |
|---|---|
| Parameter(s): | |
|    HBKG hBkg | // handle of background object to be deleted |
| Return(s): | |
|    EA_OK | // function succeeded |
|    EA_FAILED | // function failed |

EASetBackgroundData

The EASetBackgroundData function provides the created background with graphical data retrieved from the specified bitmap. It is the responsibility of application 202 to ensure that the bitmap has valid data loaded and the proper transparency information set prior to this call. If the background was sequenced, this call should not be used to set the data. This is an API function exported by a graphics object library. In response to this function call, the graphics object library calls the EASetSequencedBackgroundData function into the graphics object library with the number of bitmaps set to 1.

| | |
|---|---|
| Parameter(s): | |
|    HBKG hBkg | // handle of background object |
|    HEABMP hEABmp | // handle of bitmap of data |
| Return(s): | |
|    EA_OK | // function succeeded |
|    EA_FAILED | // function failed |

EAGetBackground Data

The EAGetBackgroundData function retrieves the data set for a background via a previous EASetBackgroundData call. This function retrieves the handle to the bitmap of data for the specified background. The background data must have been set with a prior EASetBackgroundData call. This call should not be used to get data from sequenced backgrounds. This is an API function exported by a graphics object library. In response to this function call, the graphics object library calls the EAGetSequencedBackgroundData function into the graphics object library with the number of bitmaps set to 1.

| | |
|---|---|
| Parameter(s): | |
|    HBKG hBkg | // handle to background |
|    LPHEABMP lphEAbmp | // pointer to handle of bitmap of data |
| Return(s): | |
|    EA_OK | // function succeeded, handle of bitmap returned properly |
|    EA_FAILED | // function failed |

EACreateSequencedBackground

The EACreateSequencedBackground function creates a sequenced background; that is, the background's graphical data is a series of bitmaps. This function prepares the background object to receive a series of bitmaps as graphical data. The number of bitmaps must be greater than one. This is an API function exported by a graphics object library. In response to this function call, the graphics object library calls the EACreateObject function into the display mixer.

EACreateTile

The EACreateTile function creates a tile whose size and data format are determined strictly by the bitmap of graphical data. All created tiles should be deleted when they are no longer needed. This is an API function exported by a graphics object library. In response to this function call, the graphics object library calls the EACreateSequencedTile function into the graphics object library with the number of bitmaps set to 1.

```
Parameter(s):
    LPHBKG lphBkg        // pointer to handle of created sequenced background
    WORD wNumBmps        // number of bitmaps of data for the background, this number must be
                         // greater than one
Return(s):
    EA_OK                // function succeeded
    EA_FAILED            // function failed
```

EASetSequencedBackgroundData

The EASetSequencedBackgroundData function supplies bitmap data to a background that was previously sequenced. This function provides the sequenced background with graphical data retrieved from the specified bitmap. It is the responsibility of application 202 to ensure that the bitmap has valid data loaded and the proper transparency information set prior to this call. It is also the responsibility of application 202 to ensure that the background is sequenced and the specified index is within the range of 0 to wNumBmps-1. This is an API function exported by a graphics object library. In response to this function call, the graphics object library calls the EASetMsgFunction, EASetDrawFunction, EASetWidth, and EASetHeight functions into the display mixer.

```
Parameter(s):
    HBKG hBkg            // handle to sequenced background
    HEABMP hEABmp        // handle to the bitmap of data
    WORD index           // index into sequence
Return(s):
    EA_OK                // function succeeded
    EA_FAILED            // function failed
    EA_DIFFERENT_BMPS    // function failed because bitmap is not the same as those previously
                         // set for this background
```

EAGetSequencedBackgroundData

The EAGetSequencedBackgroundData function retrieves the data set for a sequenced background via a previous EASetSequencedBackgroundData call. This function retrieves the bitmap handle of data for the specified sequenced background. The background data must have been set with a prior EASetSequencedBackgroundData call. It is the responsibility of application 202 to ensure that the index is within the range of 0 to wNumBmps-1. This is an API function exported by a graphics object library.

```
Parameter(s):
    HBKG hBkg            // handle to background
    LPHEABMP lphEAbmp    // pointer to handle of bitmap of data
    WORD index           // sequence index
Return(s):
    EA_OK                // function succeeded, handle of bitmap returned properly
    EA_FAILED            // function failed
```

```
Parameter(s):
    LPHTILE lphTile          // pointer to handle of created tile
Return(s):
    EA_OK                    // function succeeded, a pointer pointing to the created tile is returned
    EA_FAILED                // function failed
    EA_OUT_OF_MEMORY         // function failed, cannot allocate memory
```

EADeleteTile

The EADeleteTile function deletes a previously created tile. All created tiles should be deleted when they are no longer needed. This is an API function exported by a graphics object library. In response to this function call, the graphics object library calls the EADeleteObject function into the display mixer.

```
Parameter(s):
    HTILE hTile              // handle of tile object to be deleted
Return(s):
    EA_OK                    // function succeeded
    EA_FAILED                // function failed
```

EASetActiveState

The EASetActiveState function assigns a visibility to a tile object. An active of TRUE makes the tile visible. All visibilities are initialized to FALSE. A tile's active state is initialized to TRUE. This is an API function exported by a graphics object library.

```
Parameter(s):
    HTILE hTile              // handle to the tile
    BOOL active              // assigned visibility
Return(s):
    EA_OK                    // function succeeded
    EA_FAILED                // function failed
```

EAGetActiveState

The EAGetActiveState function retrieves the current active status value of a tile. This is an API function exported by a graphics object library.

```
Parameter(s):
    HTILE hTile              // handle to the tile
    LPBOOL lpActive          // pointer to visibility value
Return(s):
    EA_OK                    // function succeeded
    EA_FAILED                // function failed
```

EASetTileData

The EASetTileData function provides the created tile with graphical data retrieved from the specified bitmap. It is the responsibility of application 202 to ensure that the bitmap has valid data loaded and the proper transparency information set prior to this call. If the tile was sequenced, this call should not be used to set the data. This is an API function exported by a graphics object library. In response to this function call, the graphics object library calls the EASetSequencedTileData function into the graphics object library with the number of bitmaps set to 1.

```
Parameter(s):
    HTILE hTile              // handle of tile
    HEABMP hEABmp            // handle of bitmap of data
Return(s):
    EA_OK                    // function succeeded
    EA_FAILED                // function failed
```

EAGetTileData

The EAGetTileData function retrieves the data set for a tile via a previous EASetTileData call. This function retrieves the handle to the bitmap of data for the specified tile. The tile data must have been set with a prior EASetTileData call. This call should not be used to get data from sequenced tiles. This is an API function exported by a graphics object library. In response to this function call, the graphics object library calls the EAGetSequencedTileData function into the graphics object library with the number of bitmaps set to 1.

```
Parameter(s):
    HTILE hTile              // handle to tile
    LPHEABMP lphEAbmp        // pointer to handle of bitmap of data
Return(s):
    EA_OK                    // function succeeded, handle of bitmap returned properly
    EA_FAILED                // function failed
```

EACreateSequencedTile

The EACreateSequencedTile function creates a sequenced tile; that is, the tile's graphical data is a series of bitmaps. This function prepares the tile to receive a series of bitmaps as graphical data. The number of bitmaps must be greater than one. This is an API function exported by a graphics object library. In response to this function call, the graphics object library calls the EACreateObject and EASetMsgFunction functions into the display mixer.

| Parameter(s): | |
|---|---|
| HTILE hTile | // handle of tile to be sequenced |
| WORD wNumBmps | // number of bitmaps of data for the tile, this number must be greater than one |
| Return(s): | |
| EA_OK | // function succeeded |
| EA_FAILED | // function failed |
| EA_OUT_OF_MEMORY | // function failed, cannot allocate sufficient memory |

EASetSequencedTileData

The EASetSequencedTileData function supplies bitmap data to a tile that was previously sequenced. This function provides the sequenced tile with graphical data retrieved from the specified bitmap. It is the responsibility of application 202 to ensure that the bitmap has valid data loaded and the proper transparency information set prior to this call. It is also the responsibility of application 202 to ensure that the tile is sequenced and the specified index is within the range of 0 to dwNumBmps-1. This is an API function exported by a graphics object library.

| Parameter(s): | |
|---|---|
| HTILE hTile | // handle to sequence tile |
| HEABMP hEABmp | // handle to bitmap of data |
| WORD index | // index into sequence |
| Return(s): | |
| EA_OK | // function succeeded |
| EA_FAILED | // function failed |

EAGetSequencedTileData

The EAGetSequencedTileData function retrieves the data set for a sequenced tile via a previous EASetSequencedTileData call. This function retrieves the bitmap handle of data for the specified sequenced tile. The tile data must have been set with a prior EASetSequencedTileData call. It is the responsibility of application 202 to ensure that the index is within the range of 0 to wNumBmps-1. This is an API function exported by a graphics object library.

| Parameter(s): | |
|---|---|
| HTILE hTile | // handle to tile |
| LPHEABMP lphEAbmp | // pointer to handle of bitmap of data |
| WORD index | // sequence index |
| Return(s): | |
| EA_OK | // function succeeded, handle of bitmap returned properly |
| EA_FAILED | // function failed |

EACreateGrid

The EACreateGrid function creates a grid with a width of (wMtiles * wTileWidth) pixels and a height of (wNtiles * wTileHeight) pixels. All created grids should be deleted when they are no longer needed. This is an API function exported by a graphics object library. In response to this function call, the graphics object library calls the EACreateObject function into the display mixer.

```
Parameter(s):
    WORD wMtiles           // number of tiles in a row
    WORD wNtiles           // number of tiles in a column
    WORD wTileWidth        // width of each tile in pixels
    WORD wTileHeight       // height of each tile in pixels
    LPHGRID lphGrid        // pointer to handle of created grid
Return(s):
    EA_OK                  // function succeeded, a pointer pointing to the created grid is
                              returned
    EA_FAILED              // function failed
    EA_OUT_OF_MEMORY       // function failed, could not allocate sufficient memory
```

The following data structure defines a way to address each location in a grid, which is used in subsequent functions:

```
typedef struct {
    WORD mTile;            // mth column of tile
    WORD nTile;            // nth row of tile
} LOCATION, FAR * LPLOCATION
```

EADeleteGrid

The EADeleteGrid function deletes a previously created grid object. All created grids should be deleted when they are no longer needed. This is an API function exported by a graphics object library. In response to this function call, the graphics object library calls the EADeleteObject function into the display mixer.

```
Parameter(s):
    HGRID hGrid            // handle of grid to be deleted
Return(s):
    EA_OK                  // function succeeded
    EA_FAILED              // function failed
```

EASetGridData

The EASetGridData function sets a tile for a particular grid location. The location is specified by the loc parameter. It is the responsibility of application 202 to ensure that the size of the tile is the same as the width and height of the location it is to go into. This is an API function exported by a graphics object library. In response to this function call, the graphics object library calls the EASetMsgFunction, EASetDrawFunction, EASetWidth, and EASetHeight functions into the display mixer.

```
Parameter(s):
    HGRID hGrid            // handle of grid
    LOCATION loc           // location on the grid
    HTILE hTile            // handle of tile of data
Return(s):
    EA_OK                  // function succeeeded
    EA_FAILED              // function failed
    EA_INVALID_SIZE        // function failed, size of tile is different from size of grid location
```

EAGetGridData

The EAGetGridData function retrieves the tile that was previously set for a specific location on a grid. This function retrieves the handle to the tile for the specific grid at location loc. The grid location must have been set with a prior EASetGridData call. This is an API function exported by a graphics object library.

```
Parameter(s):
    HGRID hGrid            // handle to grid
    LOCATION loc           // location on the grid
    LPHTILE lphTile        // pointer to handle of tile of data
```

EAClearGridData

The EAClearGridData function clears the tile at location loc in the grid. The tile is previously set via a prior EASetGridData call. This is an API function exported by a graphics object library.

```
Parameter(s):
    HGRID hGrid         // handle of grid
    LOCATION loc        // location on the grid
Return(s)
    EA_OK               // function succeeded
    EA_FAILED           // function failed
```

EACreateFlatGrid

The EACreateFlatGrid function creates a flat grid with a width of (wMtiles * wTileWidth) pixels and a height of (wNtiles * wTileHeight) pixels. All created flat grids should be deleted when they are no longer needed. This is an API function exported by a graphics object library. In response to this function call, the graphics object library calls the EACreateObject function into the display mixer.

```
Parameter(s):
    WORD wMtiles             // number of tiles in a row
    WORD wNtiles             // number of tiles in a column
    WORD wTileWidth          // width of each tile in pixels
    WORD wTileHeight         // height of each tile in pixels
    WORD MaxUniqueTiles      // maximum number of unique tiles
    LPHGRID lphGrid          // pointer to handle of created flat grid
Return(s):
    EA_OK                    // function succeeded, a pointer pointing to the created flat grid is
                             returned
    EA_FAILED                // function failed
    EA_OUT_OF_MEMORY         // function failed, could not allocate sufficient memory
```

The following data structure defines a way to address each location in a flat grid, which is used in subsequent functions:

```
typedef struct {
    WORD mTile;         // mth column of tile
    WORD nTile;         // nth row of tile
} LOCATION, FAR * LPLOCATION
```

EADeleteFlatGrid

The EADeleteFlatGrid function deletes a previously created flat grid object. All created flat grids should be deleted when they are no longer needed. This is an API function exported by a graphics object library. In response to this function call, the graphics object library calls the EADeleteObject function into the display mixer.

```
Parameter(s):
    HGRID hGrid         // handle of flat grid to be deleted
Return(s):
    EA_OK               // function succeeded
    EA_FAILED           // function failed
```

EASetFlatGridData

The EASetFlatGridData function sets a tile at a particular flat grid location. The location is specified by the loc parameter. It is the responsibility of application 202 to ensure that the size of the tile is the same as the width and height of the grid location. This is an API function exported by a graphics object library. In response to this function call, the graphics object library calls the EASetMsgFunction, EASetDrawFunction, EASetWidth, and EASetHeight functions into the display mixer.

```
Parameter(s):
    HGRID hGrid             // handle of flat grid
    LOCATION loc            // location on the flat grid
    HTILE hTile             // handle of tile of data
Return(s):
    EA_OK                   // function succeeded
    EA_FAILED               // function failed
    EA_INVALID_SIZE         // function failed, size of tile is different from size of flat grid location
```

EAGetFlatGridData

The EAGetFlatGridData function retrieves the tile that was set for a specific location on a flat grid via a previous EASetFlatGridData call. This function retrieves the handle to the tile for the specific flat grid at location loc. The flat grid data must have been set with a prior EASetFlatGridData call. This is an API function exported by a graphics object library.

```
typedef struct {
    WORD mTile;     // mth column of line
    WORD nTile;     // nth row of tile
} LOCATION, FAR * LPLOCATION
```

```
Parameter(s):
    HGRID hGrid         // handle to flat grid
    LOCATION loc        // location on the flat grid
    LPHTILE lphTile     // pointer to handle of tile of data
Return(s):
    EA_OK               // function succeeded, handle of tile returned properly
    EA_FAILED           // function failed
```

EAClearFlatGridData

The EAClearFlatGridData function clears the tile in the flat grid at location loc. The tile is previously set via an EASetFlatGridData call. This is an API function exported by a graphics object library.

```
Parameter(s):
    GRID hGrid          // handle of flat grid
    LOCATION loc        // location on the flat grid
Return(s):
    EA_OK               // function succeeded
    EA_FAILED           // function failed
```

EACreateFixedGrid

The EACreateFixedGrid function creates a grid with locations fixed at 8 pixels wide by 8 pixels high. All created fixed grids should be deleted when they are no longer needed. This is an API function exported by a graphics object library. In response to this function call, the graphics object library calls the EACreateObject function into the display mixer.

EADeleteFixedGrid

The EADeleteFixedGrid function deletes a previously created fixed grid object. All created fixed grids should be deleted when they are no longer needed. This is an API function exported by a graphics object library. In response to this function call, the graphics object library calls the EADeleteObject function into the display mixer.

```
Parameter(s):
    HGRID hGrid         // handle of fixed grid to be deleted
Return(s):
    EA_OK               // function succeeded
    EA_FAILED           // function failed
```

EASetFixedGridData

The EASetFixedGridData function sets a tile at a particular fixed grid location. The location is specified by the loc parameter. It is the responsibility of application 202 to ensure that the size of the tile is 8 pixels high and 8 pixels wide. This is an API function exported by a graphics object library. In response to this function call, the graphics object

```
Parameter(s):
    WORD wMtiles            // number of tiles in a row
    WORD wNtiles            // number of tiles in a column
    WORD MaxUniqueTiles     // maximum number of unique tiles
    LPHGRID lphGrid         // pointer to handle of created fixed grid
Return(s):
    EA_OK                   // function succeeded
    EA_FAILED               // function failed
    EA_OUT_OF_MEMORY        // function failed, could not allocate sufficient memory
```

The following data structure defines a way to address each location in a fixed grid, which is used in subsequent functions:

library calls the EASetMsgFunction, EASetDrawFunction, EASetWidth, and EASetHeight functions into the display mixer.

```
Parameter(s):
    HGRID hGrid         // handle of fixed grid
    LOCATION loc        // location on the fixed grid
    HTILE hTile         // handle of tile that supplies the data
Return(s):
    EA_OK               // function succeeded
    EA_FAILED           // function failed
    EA_INVALID_SIZE     // function failed because size of tile is not (8x8) pixels
```

EAGetFixedGridData

The EAGetFixedGridData function retrieves the tile that was set for a specific location on a fixed grid via a previous EASetFixedGridData call. This function retrieves the handle to the tile for the specific fixed grid at location loc. The tile is set with a prior EASetFixedGridData call. This is an API function exported by a graphics object library.

```
Parameter(s):
    HGRID hGrid         // handle of fixed grid
    LOCATION loc        // location on the fixed grid
    LPHTILE lphTile     // pointer to handle of tile supplying the data
Return(s):
    EA_OK               // function succeeded
    EA_FAILED           // function failed
```

EAClearFixedGridData

The EAClearFixedGridData function clears the tile in the fixed grid location. The tile was previously set to the particular location with an EASetFixedGridData call. This function clears the tile at the location specified by loc. This is an API function exported by a graphics object library.

```
Parameter(s):
    HGRID hGrid         // handle of fixed grid
    LOCATION loc        // location on the fixed grid
Return(s):
    EA_OK               // function succeeded
    EA_FAILED           // function failed
```

EACreateSurface

The EACreateSurface function creates a surface where created objects are gathered. This is an API function exported by the surface/attribute manager. In response to this function call, the surface/attribute manager calls the EACreateObject, EASetWidth, and EASetHeight functions into the display mixer.

```
Parameter(s):
    DWORD dwWidth       // width of surface in pixels
    DWORD dwHeight      // height of surface in pixels
    DWORD dwColorType   // format of surface
    DWORD dwBitCount    // bit depth of surface
    DWORD dwMask[4]     // for non-Windows GDI RGB formats, dwMask specifies the
                        bitmasks for each of red, green, blue, and alpha channel values
    LPHSURF lphSurf     // pointer to the handle of the created surface
Return(s):
    EA_OK               // function succeeded, handle of the created surface is returned in
                        LPHSURF
    EA_FAILED           // function failed
```

EADeleteSurface

The EADeleteSurface function deletes a previously created surface. This is an API function exported by the surface/attribute manager. In response to this function call, the graphics object library calls the EADeleteObject function into the display mixer.

```
Parameter(s):
    HSURF hSurf         // handle to the surface
Return(s):
    EA_OK               // function succeeded
    EA_FAILED           // function failed
```

EASetSurfaceColor

The EASetSurfaceColor function assigns a default color to a surface. This function sets the default color of the surface. During display, if a pixel location is not occupied by graphical data, the default color will be displayed. This is an API function exported by the surface/attribute manager.

```
Parameter(s):
    HSURF hSurf         // handle to the surface
    DWORD dwColor       // default color
Return(s):
    EA_OK               // function succeeded
    EA_FAILED           // function failed
    EA_INVALIDHANDLE    // hSurf is invalid
    EA_INVALIDCOLOR     // color value is invalid
```

EAGetSurfaceColor

The EAGetSurfaceColor function returns the default color assigned to the surface that was set via a previous EASetSurfaceColor call. This is an API function exported by the surface/attribute manager.

```
Parameter(s):
    HSURF hSurf         // handle to the surface
    LPDWORD lpdwColor   // pointer to default color
```

-continued

```
Return(s):
    EA_OK               // function succeeded
    EA_FAILED           // function failed
    EA_INVALIDHANDLE    // hSurf is invalid
    EA_NOPRIORSETTING   // no default color was set
```

EASetDrawOrder

The EASetDrawOrder function assigns a draw order to an object (e.g., a sprite, background, grid, or surface object or any generic object). The draw order is specified in dwDrawOrder and must be greater than zero. Objects with larger draw orders are rendered behind objects with smaller draw orders. All draw orders are initialized to one. This is an API function exported by the surface/attribute manager.

| Parameter(s): | |
|---|---|
| HOBJ hObj | // handle to an object |
| DWORD dwDrawOrder | // assigned draw order |
| Returns(s): | |
| EA_OK | // function succeeded |
| EA_INVALID_ATTRIB | // hObj does not have draw order as an attribute |
| EA_INVALID_DRAWORDER | // dwDrawOrder is less than one |

EAGetDrawOrder

The EAGetDrawOrder function retrieves a previously assigned draw order for an object (i.e., a sprite, background, grid, or surface). This is an API function exported by the surface/attribute manager.

EASetPosition

The EASetPosition function sets the position of the object. This function specifies the location on the destination, where the upper left hand corner of the object is to be mapped to. It is the responsibility of application 202 to ensure that the location provided is valid. All object positions are initialized to (0,0). This is an API function exported by the surface/attribute manager.

| Parameter(s): | |
|---|---|
| HOBJ hObj | // handle to an object |
| LPDWORD lpdwDrawOrder | // pointer to assigned draw order |
| Return(s): | |
| EA_OK | // function succeeded |
| EA_INVALID_ATTRIB | // object does not have draw order as a valid attribute |

EASetVisibility

The EASetVisibility function determines whether a generic object (e.g., sprite, background, grid, or surface) is displayed or not. This function specifies whether the object is displayed or hidden from view. A displayability of TRUE indicates that the object is displayed on the destination the next time the EADraw call is made. All displayabilities are initialized to FALSE. This is an API function exported by the surface/attribute manager.

| Parameter(s): | |
|---|---|
| HOBJ hObj | // handle to an object |
| long Display | // assigned displayability |
| Return(s): | |
| EA_OK | // function succeeded |
| EA_INVALID_ATTRIB | // object does not have visibility as a valid attribute |

EAGetVisibility

The EAGetVisibility function retrieves the current display state of the object. This is an API function exported by the surface/attribute manager.

| Parameter(s): | |
|---|---|
| HOBJ hObj | // handle to an object |
| LPLONG lpDisplay | // pointer to displayability value |
| Return(s): | |
| EA_OK | // function succeeded |
| EA_INVALID_ATTRIB | // object does not have visibility as a valid attribute |

| Parameter(s): | |
|---|---|
| HOBJ hObj | // handle to an object |

-continued

| | |
|---|---|
| POINTL Ptl | // x and y coordinates of the position where the upper left hand corner of the object is to be mapped to |
| Return(s): | |
| EA_OK | // function succeeded |
| EA_INVALID_ATTRIB | // object does not have position as a valid attribute |

EAGetPosition

The EAGetPosition function retrieves the position of the object on the destination. This is an API function exported by the surface/attribute manager.

| | |
|---|---|
| Parameter(s): | |
| HOBJ hObj | // handle to an object |
| LPPOINTL lpPtl | // x and y coordinates of the position where the object is currently located |
| Return(s): | |
| EA_OK | // function succeeded |
| EA_INVALID_ATTRIB | // object does not have position as a valid attribute |

EASetView

The EASetView function selects the portion of an object that is to be viewed. The rSrc region of the source object is retrieved and mapped to the location specified in EASetPosition. This is an API function exported by the surface/attribute manager.

| | |
|---|---|
| Parameter(s): | |
| HOBJ hObj | // handle to an object |
| RECTWH rwhSrc | // rectangular portion of the source object to be retrieved |
| Return(s): | |
| EA_OK | // function succeeded |
| EA_INVALID_ATTRIB | // object does not have view as a valid attribute |
| EA_OUT_OF_RANGE | // view is larger than object size |

EAGetView

The EAGetView function returns an object's currently selected view. This function retrieves the current viewing region of an object. This is an API function exported by the surface/attribute manager.

| | |
|---|---|
| Parameter(s): | |
| HOBJ hObj | // handle to an object |
| LPRECTWH lprwhSrc | // pointer to the view region of the source object |
| Return(s): | |
| EA_OK | // function succeeded |
| EA_INVALID_ATTRIB | // object does not have view as a valid attribute |

EASetCurrentImage

The EASetCurrentImage function specifies which image in a sequenced object provides the current data for display. A sequenced object, for instance, a sequenced sprite, contains more than one bitmap of graphical data. This function specifies which of the bitmaps should be used for that sequenced sprite. This function can be used to cycle through all the bitmaps in the sequenced object at a regular rate, generating the notion of motion as a result. The data in index zero is by default set to be the current image. This is an API function exported by the surface/attribute manager.

| | |
|---|---|
| Parameter(s): | |
| HOBJ hObj | // handle to a sequenced object |
| WORD Index | // index into the sequence where the corresponding data becomes the current image |
| Return(s): | |
| EA_OK | // function succeeded |
| EA_INVALID_ATTRIB | // object is not sequenced |

| | |
|---|---|
| EA_CLIPPED_RANGE | // image to be set is either beyond the number of images available, in which case, the image is set to be the last image in the sequence; or, the image to be set is negative, in which case, the current image is set to be the first image |

EAGetCurrentImage

The EAGetCurrentImage function retrieves the index whose data was previously set to supply the current image. This function retrieves the index containing graphical data that provided data for the current image. This is an API function exported by the surface/attribute manager.

| | |
|---|---|
| Parameter(s): | |
| HOBJ hObj | // handle to a sequenced object |
| LPWORD lpIndex | // pointer to the index into the sequence where the data supplies the current image |
| Return(s): | |
| EA_OK | // function succeeded, the index is returned in the pointer |
| EA_INVALID_ATTRIB | // object is not sequenced |

EAIncCurrentImage

The EAIncCurrentImage function sets the current image by incrementing the sequence index. This function allows the current image to be changed for a sequenced object by merely incrementing the sequence index. This function is equivalent to calling EASetCurrentImage with the appropriate index. When the index reaches the end of the sequence, the index will be "incremented" to zero at the next EAIncCurrentImage call. This is an API function exported by the surface/attribute manager.

| | |
|---|---|
| Parameter(s): | |
| HOBJ hObj | // handle to an object |
| Return(s): | |
| EA_OK | // function succeeded |
| EA_INVALID_ATTRIB | // object is not sequenced |

EADecCurrentImage

The EADecCurrentImage function sets the current image by decrementing the sequence index. This function allows the current image to be changed for a sequenced object by merely decrementing the sequence index. This function is equivalent to calling EASetCurrentImage with the appropriate index. When the index reaches zero, the index will be "decremented" to the end of the sequence at the next EADecCurrentImage call. This is an API function exported by the surface/attribute manager.

| | |
|---|---|
| Parameter(s): | |
| HOBJ hObj | // handle to an object |
| Return(s): | |
| EA_OK | // function succeeded |
| EA_INVALID_ATTRIB | // object is not sequenced |

EASetDestination

The EASetDestination function specifies the destination for an object. The style of the destination may be EA_DSTYLE_SURFACE to denote a surface object, in which case a valid hSurf would be supplied as the hDest. Another style may be EA_DSTYLE_HWND to denote a created window, in which case a valid hWnd would be supplied as the hDest. Another style of the destination may be EA_DSTYLE_MEMORY to denote an application-defined destination, in which case a valid memory handle should be supplied as the hDest. This is an API function exported by the surface/attribute manager.

| Parameter(s): | |
|---|---|
| HOBJ hObj | // handle to an object |
| DSTYLE dStyle | // style of destination |
| HDEST hDest | // handle to the destination |
| Return(s): | |
| EA_OK | // function succeeded |
| EA_INVALID_ATTRIB | // destination is not a valid attribute for hObj |
| EA_FAILED | // function failed |

EAGetDestination

The EAGetDestination function retrieves the current destination for the specified object which was set via a previous call to EASetDestination. This is an API function exported by the surface/attribute manager.

| Parameter(s): | |
|---|---|
| HOBJ hObj | // handle to an object |
| LPDSTYLE lpdStyle | // pointer to destination style |
| LPHDEST lphDest | // pointer to destination |
| Return(s): | |
| EA_OK | // function succeeded |
| EA_FAILED | // function failed |

EASetEffect

The EASetEffect function applies an effect to an object. To change an effect, this function may be called again to replace the old parameters of the effect with the new parameters of the effect. These parameter changes will be reflected in the affected object the next time EADraw is called. This is an API function exported by the surface/attribute manager.

| Parameter(s): | |
|---|---|
| HOBJ hObj | // handle to an object |
| DWORD dwEffectStyle | // one of the available effects from the table |
| LPVOID pEffectStruct | // structure containing the values for the specific effect |
| Return(s): | |
| EA_OK | // function succeeded |
| EA_BAD_OBJ_HANDLE | // need a valid object |
| EA_BAD_EFFECT | // dwEffectStyle parameter is out of range |
| EA_BAD_ARGUMENTS | // pEffectStruct is wrong |

EAClearEffect

The EAClearEffect function clears one or more effects that were applied to an object using EASetEffect. All effects enabled for an object can be cleared at once by calling EAClearEffect with the EA_ALL_EFFECTS symbol. This is an API function exported by the surface/attribute manager.

| Parameter(s): | |
|---|---|
| HOBJ hObj | // handle to an object |
| DWORD dwEffectStyle | // one or more of the effects bitwise OR'ed together |
| Return(s): | |
| EA_OK | // function succeeded |
| EA_BAD_OBJ_HANDLE | // need a valid object |
| EA_BAD_EFFECT | // dwEffectStyle parameter is out of range |

EAGetEffectStyles

The EAGetEffectStyles function returns the effects that are currently enabled for the given object. This function sets the bits in the DWORD that correspond to the effects that are currently enabled for the given object handle. This is an API function exported by the surface/attribute manager.

```
Parameter(s):
    HOBJ hObj                    // handle to an object
    LPDWORD lpdwEffectStyles     // effects currently active for this object
Return(s):
    EA_OK                        // function succeeded
    EA_BAD_OBJ_HANDLE            // need a valid object
```

EAGetEffectStyleParams

The EAGetEffectStyleParams function returns the currently set parameters for the specific effect. This function returns the current values of the parameters for the given object and the specified style. This is an API function exported by the surface/attribute manager.

```
Parameter(s):
    HOBJ hObj                    // handle to an object
    DWORD dwEffectStyle          // one of the available effects
    LPVOID lpParamStruct         // parameters for the specific effect
Return(s):
    EA_OK                        // function succeeded
    EA_BAD_OBJ_HANDLE            // need a valid object
    EA_BAD_EFFECT                // dwEffectStyle parameter is out of range
```

EACreateGroup

The EACreateGroup function creates a group and returns the handle. Objects are added to the group using EAAddObjectToGroup. There is no limit on the number of objects in the group or the number of groups. This is an API function exported by the surface/attribute manager.

```
Parameter(s):
    PHGRP lphGrp                 // returned handle for the new group
Return(s):
    EA_OK                        // function succeeded
    EA_FAILED                    // function failed
```

EADeleteGroup

The EADeleteGroup function deletes a group. This function removes all of the objects in a group and then deletes the group. It is valid to delete a group that still contains objects. This is an API function exported by the surface/attribute manager.

```
Parameter(s):
    HGRP hGrp                    // handle for the group
Return(s):
    EA_OK                        // function succeeded
    EA_FAILED                    // function failed
```

EAAddObjectToGroup

The EAAddObjectToGroup function adds an object to a group. Any generic object can be a member of a group (e.g., sprites, backgrounds, and grids). An object may be a member of more than one group at the same time. However, it can only be added to the same group exactly once. This is an API function exported by the surface/attribute manager.

```
Parameter(s):
    HGRP hGrp                    // handle for the group
    HOBJ hObj                    // handle to an object
Return(s):
    EA_OK                        // function succeeded
    EA_BAD_OBJ_HANDLE            // hObj does not specify a valid object
    EA_BAD_GRP_HANDLE            // hGrp does not specify a valid group
    EA_OBJECT_ALREADY_A_MEMBER   // hObj is already a member of a group
```

EARemoveObjectFromGroup

The EARemoveObjectFromGroup function removes an object from a group. This is an API function exported by the surface/attribute manager.

```
Parameter(s):
    HGRP hGrp                    // handle for the group
    HOBJ hObj                    // handle to an object
Return(s):
    EA_OK                        // function succeeded
    EA_BAD_OBJ_HANDLE            // hObj does not specify a valid object
    EA_BAD_GRP_HANDLE            // hGrp does not specify a valid group
    EA_OBJECT_NOT_A_MEMBER       // hObj is not a member of a group
```

EAListObjectsInGroup

The EAListObjectsInGroup function returns a list of all the objects that are a member of a group. This function returns the handles that are members of the specified group. The application's buffer should be allocated with the number of objects in the group times the size that a compiler allocates for an HOBJ (i.e., sizeof(HOBJ) in the C computer language). The number of objects in the group can be retrieved by calling the EAGetNumObjectsInGroup function. This is an API function exported by the surface/attribute manager.

```
Parameter(s):
    HGRP hGrp                    // handle for the group
    LPBYTE lpBuffer              // buffer for surface/attribute manager to place list
    WORD wBufferSize             // size of lpBuffer
Return(s):
    EA_OK                        // function succeeded
    EA_BAD_GRP_HANDLE            // hGrp is not a valid group handle
```

EAGetNumObjectsInGroup

The EAGetNumObjectsInGroup function returns the number of objects that are currently members of a group. This is an API function exported by the surface/attribute manager.

```
Parameter(s):
    HGRP hGrp                    // handle for the group
    LPLONG lpNum                 // number of object in the group
Return(s):
    EA_OK                        // function succeeded
    EA_BAD_GRP_HANDLE            // hGrp is not a valid group handle
```

EAGroupSetAttrib

The EAGroupSetAttrib function allows the user to set the value of the specified attribute for all the members of the group. This function changes an attribute for all of the members of the specified group. If the attribute is not valid for one of the group members (e.g., sprites and View), then it will be ignored. This is an API function exported by the surface/attribute manager.

```
Parameter(s):
    HGRP hGrp              // handle for the group
    EA_ATTRIBUTE wAttrib   // attribute
    long value             // new value for attribute
Return(s):
    EA_OK                  // function succeeded
    EA_BAD_GRP_HANDLE      // hGrp is not a valid group handle
```

EAGroupAdjustAttrib

The EAGroupAdjustAttrib function allows the user to adjust the value of the specified attribute for all the members of the group by specifying a delta from the current value. This function changes the specified attribute by the delta value for all of the members of the specified group. This operation is equivalent to:

```
attribute+=DeltaValue;
```

If the attribute that has been specified is not valid for one of the group members (e.g., sprites and View), then it will be ignored. This is an API function exported by the surface/attribute manager.

```
Parameter(s):
    HGRP hGrp              // handle for the group
    EA_ATTRIBUTE wAttrib   // attribute
    long DeltaValue        // delta value for attribute
Return(s):
    EA_OK                  // function succeeded
    EA_BAD_GRP_HANDLE      // hGrp is not a valid group handle
```

EAGroupGetAttrib

The EAGroupGetAttrib function returns the value of the attribute for the group. There is a possibility that the specified attribute will not have the same value across all objects in the group. When this occurs, the value of the attribute in the first object in the group will be returned. This is an API function exported by the surface/attribute manager.

```
Parameter(s):
    HGRP hGrp              // handle for the group
    EA_ATTRIBUTE wAttrib   // attribute
    LPLONG lpValue         // return location for attribute
Return(s):
    EA_OK                  // function succeeded
    EA_BAD_GRP_HANDLE      // hGrp is not a valid group handle
```

EADraw

The EADraw function draws the surface to its destination. This function updates the visible portion of the surface and then draws it to the destination which is typically the display buffer for the monitor. If the surface has changed since the last draw, this function first updates or renders the surface and all of its dependent surfaces and objects before drawing. This is an API function exported by the surface/attribute manager. In response to this function call, the display mixer sequentially calls the object libraries' draw functions for the objects to be drawn to the specified surface.

```
Parameter(s):
    HSURF hSurf            // surface to be drawn
Return(s):
    EA_OK                  // function succeeded
    EA_FAILED              // function failed
```

EACreateTimer

The EACreateTimer function creates a timer with a specified frequency and returns a handle to the timer. The frequency is within a certain range (e.g., 1–1000), where the frequency implies the number of timer increments (i.e., ticks) per second. The frequency range is machine dependent. When the timer is no longer needed, it should be deleted with EADeleteTimer. This is an API function exported by the event scheduler.

Parameter(s):
| | |
|---|---|
| unsigned int TimerFreq | // timer frequency in Hz (ticks per second) |
| LPHEATIMER lphEATimer | // pointer to handle for timer just created |

Return(s):
| | |
|---|---|
| EA_OK | // function succeeded |
| EA_BAD_POINTER | // lphEATimer is bad |
| EA_FAILED | // function failed, internal system error accessing system timer |
| EA_BADFREQ | // TimerFreq is out of range for this machine |
| EA_OUT_OF_MEMORY | // cannot allocate memory for this timer |

EADeleteTimer

The EADeleteTimer function stops a timer if running and then deletes the timer. This is an API function exported by the event scheduler.

Parameter(s):
| | |
|---|---|
| HEATIMER hEATimer | // timer handle |

Return(s):
| | |
|---|---|
| EA_OK | // function succeeded |
| EA_BAD_HANDLE_TYPE | // hEATimer is not a valid timer handle |
| EA_FAILED | // internal system error accessing system timer |

EASetTimerFrequency

Once a timer is created with EACreateTimer, the EASetTimerFrequency function can be called to change the frequency of the timer, where the new frequency is still within the same range restrictions as in EACreateTimer. This is an API function exported by the event scheduler.

Parameter(s):
| | |
|---|---|
| HEATIMER hEATimer | // handle of timer |
| unsigned int TimerFreq | // new timer frequency |

Return(s):
| | |
|---|---|
| EA_OK | // successful return |
| EA_BAD_HANDLE_TYPE | // hEATimer is not a valid timer handle |
| EA_BADFREQ | // TimerFreq is out of range for this machine |
| EA_CANNOT_KILL_TIMER | // internal system error stopping the timer |
| EA_TIMER_FAILED | // internal system error stopping the timer |

EAGetTimerFrequency

The EAGetTimerFrequency function retrieves the frequency assigned to a timer via a previous EACreateTimer or EASetTimerFrequency call. This is an API function exported by the event scheduler.

Parameter(s):
| | |
|---|---|
| HEATIMER hEATimer | // handle to the timer |
| unsigned int FAR * pTimerFreq | // return variable for the frequency |

Return(s):
| | |
|---|---|
| EA_OK | // successful return |
| EA_BAD_HANDLE_TYPE | // hEATimer is not a valid timer handle |
| EA_BAD_POINTER | // pTimerFreq is bad |

EAStartTimer

The EAStartTimer function starts a timer. The timer tick count, a count of the number of times the timer has ticked, will begin counting starting at 1. This is an API function exported by the event scheduler.

Parameter(s):
```
    HEATIMER hEATimer              // handle of timer object
Return(s):
    EA_OK                          // successful return
    EA_BAD_HANDLE_TYPE             // hEATimer is not a valid timer handle
    EA_TIMER_ALREADY_STARTING      // timer is already started, cannot start again
    EA_TIMER_FAILED                // internal system error starting the timer
```

EAStopTimer

The EAStopTimer function stops a timer from ticking. The timer tick count is not changed. This is an API function exported by the event scheduler.

Parameter(s):
```
    HEATIMER hEATimer              // handle to the timer
Return(s):
    EA_OK                          // function succeeded
    EA_BAD_HANDLE_TYPE             // hEATimer is not a valid timer handle
    EA_TIMER_NOT_RUNNING           // timer was not started
    EA_CANNOT_KILL_TIMER           // internal system error stopping timer
```

EAResetTimer

The EAResetTimer function resets the timer tick count to zero. If the timer is running, it will continue to run. If the timer is stopped, just the timer tick count will change; the timer will not be started. This is an API function exported by the event scheduler.

Parameter(s):
```
    HEATIMER hEATimer              // handle to timer
Return(s):
    EA_OK                          // function succeeded
    EA_BAD_HANDLE_TYPE             // hEATimer is not a valid timer handle
```

EAGetCurrentTimerTick

The EAGetCurrentTimerTick function returns the current tick value for the specified timer. This is an API function exported by the event scheduler.

Parameter(s):
```
    HEATIMER hEATimer              // handle to timer
    unsigned long FAR * pTick      // return variable for the timer tick
Return(s):
    EA_OK                          // function succeeded
    EA_BAD_HANDLE_TYPE             // hEATimer is not a valid timer handle
    EA_BAD_POINTER                 // pTick is bad
```

EASetCurrentTimerTick

The EASetCurrentTimerTick function sets the current tick value for the specified timer. This is an API function exported by the event scheduler.

Parameter(s):
```
    HEATIMER hEATtimer             // handle to timer
    DWORD Tick                     // current timer tick value
Return(s):
    EA_OK                          // function succeeded
    EA_BAD_HANDLE_TYPE             // hEATimer is not a valid timer handle
```

EACreateEvent

The EACreateEvent function creates an event to identify an activity to take place at an application-specified time or rate. Possible events are:

```
EA_EVENT_SET_ATTRIB          // set a generic attribute
    param1 = attrib to change
    param2 = new value
EA_EVENT_ADJUST_ATTRIB       // change a generic attribute
    param1 = attrib to change
    param2 = delta value
EA_EVENT_SET_EFFECT          // call EASetEffect w/params
    param1 = effect id to set
    param2 = pointer to effect params
EA_EVENT_CLEAR_EFFECT        // Call EAClearEffect w/params
    param1 = effect id to clear
EA_EVENT_DRAW                // call EADraw on a surface
    param1 = hSurf to draw
EA_EVENT_CALLBACK            // call an app-supplied function
    param1 = pointer to app-supplied function
EA_EVENT_USER                // reserved for hObj-supplied event id's
    param1 = defined by other object library
    param2 = defined by other object library
```

If an Event type other than these is sent, then the Event Scheduler will attempt to query the hObj's Message function for the dwEventType. EACreateEvent is an API function exported by the event scheduler.

```
Parameter(s):
    LPHEVENT lphEvent        // pointer to the event handle
    HOBJ hObj                // handle to object for the event
    DWORD dwEventType        // id of event to create
    long lParam1             // depends on event id
    long lParam2             // depends on event id
Return(s):
    EA_OK                    // function succeeded
    EA_BAD_POINTER           // hEvent is invalid
    EA_INVALID_HOBJ          // hObj is invalid
    EA_BAD_HANDLE_TYPE       // hObj is invalid
    EA_OUT_OF_MEMORY         // System has no more memory
```

EADeleteEvent

The EADeleteEvent function deletes a created event. If the dwEventType is not known by the event scheduler, then the event scheduler asks the hObj to delete it. If this event is still associated with a timer, then the event scheduler deletes the timer. EADeleteEvent is an API function exported by the event scheduler.

```
Parameter(s):
    HEVENT hEvent            // handle to the event
Return(s):
    EA_OK                    // function succeeded
    EA_BAD_POINTER           // hEvent is invalid
```

EAScheduleEvent

The EAScheduleEvent function schedules an event to occur at a specific time. This function takes an hEvent, associates it with the specified hTimer, and schedules it to be executed at the specified time(s) in the future for the requested number of repetitions. This is an API function exported by the event scheduler.

```
Parameter(s):
    HEATIMER hEATimer        // timer associated with the event
    HEVENT hEvent            // handle to the Event
    DWORD StartTick          // timer tick when event should start
    BYTE flags               // flags (depends on event id)
    WORD period              // how often event should occur (in ticks)
    DWORD nTicks             // # of times this event should be executed
Return(s):
    EA_OK                    // function succeeded
    EA_BAD_POINTER           // hEvent is invalid
    EA_BAD_HANDLE_TYPE       // hEvent or hEATimer are invalid
    EA_INVALID_PERIOD        // requested period not supported
    EA_TIME_ALREADY_PAST     // requested start time already happened
```

EARepeatEvent

The EARepeatEvent function repeats a scheduled event wTimes every dwTicks. If wTimes is zero, the repetition goes on infinitely. This is an API function exported by the event scheduler.

```
Parameter(s):
    HEVENT hEvent           // handle to event
    WORD wTimes             // repeat event for wTimes
    DWORD dwTicks           // repeat event every dwTicks
Return(s):
    EA_OK                   // function succeeded
    EA_FAILED               // function failed
    EA_INVALIDHANDLE        // invalid hEvent
    EA_INVALIDTICKS         // dwTicks invalid
```

EAQueryEventStatus

The EAQueryEventStatus function returns the current status on an event. Status may be one of STARTED, PERCENT_DONE, or DONE. If status code is STARTED or DONE, then the returned result is either 0 for FALSE or 1 for TRUE. If status code is PERCENT_DONE, lptResult points to an integer. This is an API function exported by the event scheduler.

```
Parameter(s):
    HEVENT hEvent           // handle to the event
    STATUS status           // type of status
    LPDWORD lptResult       // pointer to result
Return(s):
    EA_OK                   // function succeeded
    EA_FAILED               // function failed
    EA_INVALIDHANDLE        // invalid hEvent
    EA_INVALIDSTATUS        // status code is invalid
```

EAGetEventRepeat

The EAGetEventRepeat function retrieves the time period for a repeated event. This function retrieves the number of ticks an event was set to repeat at. This is an API function exported by the event scheduler.

```
Parameter(s):
    HEVENT hEvent           // handle to event
    LPDWORD lpdwTicks       // pointer to the number of ticks
Returns:
    EA_OK                   // function succeeded, handle of bitmap returned properly
    EA_FAILED               // function failed
    EA_INVALIDHANDLE        // hEvent invalid
    EA_NOTREPEATED          // hEvent was not set to repeat
```

EAUpdateEventRepeat

The EAUpdateEventRepeat function updates a repeated event with a new period. This is an API function exported by the event scheduler.

```
Parameter(s):
    HEVENT hEvent           // handle to event
    DWORD dwTicks           // new period
Return(s):
    EA_OK                   // function succeeded
    EA_INVALIDHANDLE        // invalid event handle
    EA_INVALIDTICKS         // dwTicks invalid
    EA_NOTREPEATED          // hEvent was not set to repeat
```

EASetConditionalAction

The EASetConditionalAction function allows for actions to be enabled in response to certain conditions during a scheduled or repeated event. This is an API function exported by the event scheduler.

```
Parameter(s):
    CONDITION condition     // condition
    ACTION action           // action
Return(s):
    EA_OK                   // function succeeded, handle of bitmap returned properly
    EA_FAILED               // function failed
    EA_INVALIDCOND          // invalid condition
    EA_INVALIDACTION        // invalid action
CONDITIONS and ACTIONS are defined as follows:
CONDITION               EXPLANATION LOSS_OF_FOCUS           User has activated a different application in MSW.
RETURN_OF_FOCUS         User has returned to current application.
FALL_BEHIND             Systen is overloaded and cannot keep up with the rendering demands.
```

| ACTION | EXPLANATION |
|---|---|
| PAUSE | Temporarily stop event timer associated with window. |
| IGNORE | Ignore condition. |
| CONTINUE | Restart a previously stopped event timer. |

EAGetConditionalAction

The EAGetConditionalAction function retrieves the action associated with a specified condition. This function returns the action that would be enabled if the given condition were met. The action is based on a prior EASetConditionalAction call. If no action was set, an error is returned. This is an API function exported by the event scheduler.

EAGetConditionalCallback

The EAGetConditionalCallback function retrieves the callback function associated with a specific condition. This is an API function exported by the event scheduler.

```
Parameter(s):
    CONDITION condition            // condition
    LPWORD lpwAction               // action that was associated with the condition
Return(s):
    EA_OK                          // function succeeded, pointer to associated action is returned
    EA_FAILED                      // function failed
    EA_NOPRIORSETTING              // no action was associated with the condition
```

EAClearCondition

The EAClearCondition function clears an action that was previously specified to occur in response to a given condition. This is an API function exported by the event scheduler.

```
Parameter(s):
    CONDITION condition            // condition
Return(s):
    EA_OK                          // function succeeded
    EA_FAILED                      // function failed
    EA_NOPRIORSETTING              // no action was set for the specified condition
```

EASetConditionalCallback

The EASetConditionalCallback function supplies a callback function that is to be invoked in response to a specific condition. This function allows the application to supply a function which is called by the system when the specified condition is met. This is an API function exported by the event scheduler.

```
Parameter(s)
    CONDITION condition            // condition
    CALLBACK FAR * lpFunction      // pointer to the function to be called
    LPDWORD lpdwContext            // pointer to the context to be used in the function
Return(s):
    EA_OK                          // function succeeded
    EA_FAILED                      // function failed
    EA_INVALIDCOND                 // invalid condition
    EA_INVALIDFUNCTION             // lpFunction invalid
```

```
Parameter(s):
    CONDITION condition                      // condition
    (CALLBACK FAR *) FAR * lpFunction        // address for the pointer to the callback function
    LPDWORD FAR * lpdwContext                // address for the pointer to the context
```

| Return(s): | |
|---|---|
| EA_OK | // function succeeded |
| EA_FAILED | // function failed |
| EA_NOPRIORSETTING | // no callback was set |

EASetAdjustConstraint

The EASetAdjustConstraint function allows constraining conditions to be imposed on ADJUST_ATTRIB events. Possible constraint ID's are:

| | |
|---|---|
| (EA_ADJUSTBOUNDS + EA_BOUNCE) | // the value should increment then decrement (e.g., 3-4-5-6-4-3-4-5-6 . . . ) |
| (EA_ADJUSTBOUNDS + EA_CYCLE) | // the value should increment then start over (e.g., 3-4-5-6-3-4-5-6-3-4 . . . ) |
| EA_RANDOMNESS | // any value (e.g., 3-6-4-3-5-5-6 . . . ) |

The start and end points are determined by the lMin and lMax parameters. In the above examples, lMin=3 and lMax=6. EASetAdjustConstraint is an API function exported by the event scheduler.

EASetConstraintCallback

The EASetConstraintCallback function supplies a callback function that is to be invoked in response to an event condition. This function allows the application to supply a function which is called by the system when the specified event condition is met. Possible conditions are:

| Parameter(s): | |
|---|---|
| HEVENT hEvent | // handle to event |
| DWORD dwConstraint | // constraint to be set |
| DWORD dwStyle | // style id for requested constraint id |
| long lMin | // lower bound for constraint |
| long lMax | // upper bound for constraint |
| Return(s): | |
| EA_OK | // function succeeded |
| EA_BAD_HANDLE_TYPE | // hEvent is not a valid event |

EAGetAdjustConstraint

The EAGetAdjustConstraint function retrieves parameters for the constraining conditions that were imposed on an event. This is an API function exported by the event scheduler.

| Parameter(s): | |
|---|---|
| HEVENT hEvent | // handle to event |
| DWORD dwConstraint | // constraint id to set |
| LPDWORD lpdwStyle | // returned style id for requested constraint id |
| LPLONG lplMax | // lower bound for constraint |
| LPLONG lplMin | // upper bound for constraint |
| Return(s): | |
| EA_OK | // function succeeded |
| EA_INVALID_CONSTRAINT | // dwConstraint is not applied to this hEvent |
| EA_BAD_HANDLE_TYPE | // hEvent is not a valid event |

EAClearConstraint

The EAClearConstraint function clears a previously set constraint from an event. This is an API function exported by the event scheduler.

| Parameter(s): | |
|---|---|
| HEVENT hEvent | // handle to event |
| DWORD dwConstraint | // constraint to remove |
| Return(s): | |
| EA_OK | // function succeeded |
| EA_INVALID_CONSTRAINT | // dwConstraint is not applied to this hEvent |
| EA_BAD_HANDLE_TYPE | // hEvent is not a valid event |

```
EA_EVENT_COMPLETE           // the event has finished
EA_ATTRIB_ADJUST            // an attribute was adjusted
EA_ATTRIB_ADJUST_OVERFLOW   // an attribute reached either the min or max val
```

The dwContext parameter is passed to the callback. The type for an Event callback is defined as follows:

```
typedef EARVAL (FAR PASCAL * EAEventFn)(HEVENT, DWORD msg, DWORD type,
DWORD dwContext);
```

EASetConstraintCallback is an API function exported by the event scheduler.

```
Parameter(s):
    HEVENT hEvent           // handle to event
    DWORD dwCondition       // condtiion id to set
    EAEventFn lpfnCB        // apps' callback function
    long dwContext          // apps' context parameter
Return(s):
    EA_OK                   // function succeeded
    EA_BAD_HANDLE_TYPE      // hEvent is not a valid event
```

EAGetConstraintCallback

The EAGetConstraintCallback function retrieves the callback function associated with a specific event condition. The possible conditions are the same as for the EASetConstraintCallback function. This is an API function exported by the event scheduler.

```
Parameter(s):
    HEVENT hEvent           // handle to event
    DWORD dwCondition       // condition id to set
    EAEventFn lpfnCB        // apps' callback function
    LPLONG lpdwContext      // apps' context parameter
Return(s):
    EA_OK                   // function succeeded
    EA_INVALID_CONSTRAINT   // dwConstraint is not applied to this hEvent
    EA_BAD_HANDLE_TYPE      // hEvent is not a valid event
```

EAAVChooseTableEntry

The EAAVChooseTableEntry function begins playing an audio/video clip that corresponds to the table entry passed to it. It may also flush all the other preloaded clips and clear the vector table. EAAVChooseTableEntry will begin playback of the appropriate audio/video clip. If bFlush is TRUE, it will flush the other preloaded clips and clear the vector table. This is an API function exported by an audio/video object library.

```
Parameter(s):
    HTABLE hTable           // handle to the vector table
    WORD wEntryNum          // table entry number
    BOOLEAN bFlush          // indicates whether to flush the clips and clear the table
Return(s):
    EA_OK                   // function succeeded
    EA_FAILED               // function failed
    EA_INVALID_HANDLE       // invalid HTABLE
```

EAAVClearTableEntry

The EAAVClearTableEntry function clears a vector table entry and flushes the audio/video clip associated with it. This is an API function exported by an audio/video object library.

```
Parameter(s):
    HTABLE hTable           // handle to the vector table.
    WORD wEntryNum          // entry number to clear.
Return(s):
    EA_OK                   // function succeeded.
    EA_FAILED               // function failed.
    EA_INVALID_HANDLE       // invalid HTABLE.
```

EAAVClearVectorTable

The EAAVClearVectorTable function clears an entire vector table and flushes all the audio/video clips that have been preloaded that are associated with it. This call does not need to be made if the application has already made an EAAVChooseTableEntry call. This is an API function exported by an audio/video object library.

```
Parameter(s):
    HTABLE hTable           // handle to the vector table.
Return(s):
    EA_OK                   // function succeeded.
    EA_FAILED               // function failed.
    EA_INVALID_HANDLE       // invalid HTABLE.
```

EAAVCreateLoop

The EAAVCreateLoop function creates a loop in an audio/video clip. Parameters dwStart and dwEnd define the loop's starting and ending positions, respectively, and parameter dwLoopCount defines the number of times to loop. If parameter dwImmediateFlag is TRUE, play begins immediately, starting at dwStart. When a loop is deleted, the "surrounding" clip continues to play until it reaches either its end or the value specified by the dwTo parameter when EAAVPlay was called to initiate playback. Loops can also be nested. This is an API function exported by an audio/video object library. In response to this function call, the audio/video object library calls the EASetCurrentImage function into the surface/attribute manager.

EAAVDeleteLoop

The EAAVDeleteLoop function deletes a loop in an audio/video clip. Parameter hAV specifies the clip, and parameters dwStart and dwEnd specify the loop. When a loop is deleted, the "surrounding" clip continues to play until it reaches its end or the value specified in the dwTo parameter when EAAVPlay was called to initiate playback. This is an API function exported by an audio/video object library.

```
Parameter(s):
    HAV hAV                    // handle of audio/video object.
    DWORD dwStart              // loop start position.
    DWORD dwEnd                // loop end position.
    DWORD dwLoopCount          // number of time to loop (-1 for infinite)
    DWORD dwImmediateFlag      // flag to jump to loop start immediately
Return(s):
    EA_OK                      // function succeeded.
    EA_FAILED                  // function failed.
    EA_INVALID_HANDLE          // invalid HAV.
```

EAAVCreateObject

The EAAVCreateObject function creates an audio/video object and returns a handle to it. The object is used to encapsulate an audio/video clip in a subsequent call to EAAVLoadFile. On return, lphAV contains a handle to the audio/video object if the call succeeded and is undefined otherwise. This is an API function exported by an audio/video object library. In response to this function call, the audio/video object library calls the EACreateObject function into the surface/attribute manager.

```
Parameter(s):
    LPHAV lphAV                // pointer to returned handle
Return(s):
    EA_OK                      // function succeeded
    EA_FAILED                  // function failed
    EA_OUT_OF_MEMORY           // not enough memory to allocate needed structures
```

EAAVCreateVectorTable

The EAAVCreateVectorTable function creates a vector table containing a caller-specified maximum number of entries (wNumEntries) and returns a handle to it (lphTable). This is an API function exported by an audio/video object library.

```
Parameter(s):
    LPHTABLE lphTable          // pointer to handle of the table
    WORD wNumEntries           // maximum number of entries in the table
Return(s):
    EA_OK                      // function succeeded; lphTable has been filled in
    EA_FAILED                  // function failed
    EA_OUT_OF_MEMORY           // not enough memory to allocate the table
```

```
Parameter(s):
    HAV hAV                    // handle of audio/video object
    DWORD dwStart              // loop start position
```

| | |
|---|---|
| DWORD dwEnd | // loop end position |
| Return(s): | |
| EA_OK | // function succeeded |
| EA_FAILED | // function failed |
| EA_INVALID_HANDLE | // invalid HAV |

EAAVDeleteObject

The EAAVDeleteObject function deletes an audio/video object, closes its file (opened by EAAVLoadFile), and calls EADeleteEvent (if an event had previously been created) and EADeleteObject to release the resources associated with the file. This is an API function exported by an audio/video object library. In response to this function call, the audio/video object library calls the EADeleteObject function into the surface/attribute manager and may call the EADeleteEvent function into the event scheduler.

EAAVGetTableEntry

The EAAVGetTableEntry function returns the handle (hAV) and offset (dwOffset) of an audio/video clip contained in a vector table entry. EAAVGetTableEntry returns the entry for the vector table and index passed to it. Zero values in the returned parameters indicate there was no entry for that index. This is an API function exported by an audio/video object library.

| | |
|---|---|
| Parameter(s): | |
| HAV hAV | // handle of audio/video object |
| Return(s): | |
| EA_OK | // function succeeded |
| EA_FAILED | // function failed |
| EA_INVALID_HANDLE | // invalid HAV |

EAAVDeleteVectorTable

The EAAVDeleteVectorTable function deletes a vector table, and frees its memory. This is an API function exported by an audio/video object library.

| | |
|---|---|
| Parameter(s): | |
| HTABLE hTable | // handle to the vector table |
| Return(s): | |
| EA_OK | // function succeeded |
| EA_FAILED | // function failed |
| EA_INVALID_HANDLE | // invalid HTABLE |

EAAVFlush

The EAAVFlush function flushes "persistent" or "residual" audio/video buffers from memory. Persistent buffers are in memory because the PL_PERSISTENT flag was TRUE when EAAVPreload was called. Residual buffers are in memory because they have not been played yet (PL_PERSISTENT was FALSE when EAAVPreload was called). This is an API function exported by an audio/video object library.

| | |
|---|---|
| Parameter(s): | |
| HAV hAV | // handle of audio/video object whose buffers are to be flushed |
| Return(s): | |
| EA_OK | // function succeeded |
| EA_FAILED | // function failed |
| EA_INVALID_HANDLE | // invalid HAV |
| EA_NO_BUFFERS | // there were no persistent or residual buffers for the specified audio/video object |

```
Parameter(s):
    HTABLE hTable              // handle to the vector table
    WORD wEntryNum             // table entry number
    LPHAV hAV                  // pointer to handle of the audio/video clip entry
    LPDWORD lpdwOffset;        // pointer to clip offset to preload
Return(s):
    EA_OK                      // function succeeded
    EA_FAILED                  // function failed
    EA_INVALID_HANDLE          // invalid HTABLE
```

EAAVGetTimebase

The EAAVGetTimebase function returns an audio/video object's timebase in parameter timeBase. The timebase is either samples or milliseconds, as defined by the constants TB_SAMPLES and TB_MILLISECONDS, respectively. The default is samples. This is an API function exported by an audio/video object library.

EAAVPause

The EAAVPause function pauses an audio/video clip. EAAVPause calls EADeleteEvent to stop the sample sequence from getting incremented. For video clips, this means that when the mixer calls the draw function, the current sample continues to be displayed. For audio clips, it means that no more data is sent to the audio device. This is an API function exported by an audio/video object library. In response to this function call, the audio/video object library calls the EADeleteEvent function into the event scheduler.

```
Parameter(s):
    HAV hAV                    // handle of audio/video object
    LPWORD timeBase            // pointer to timebase
Return(s):
    EA_OK                      // function succeeded; timebase is returned in timeBase
    EA_FAILED                  // function failed
    EA_INVALID_HANDLE          // invalid HAV
```

EAAVLoadFile

The EAAVLoadFile function associates an audio/video file with an audio/video object created by EAAVCreateObject. EAAVLoadFile opens the audio/video file identified by lpszFilename, reads the file's main and stream headers, and uses the information from the headers to set various attributes, both generic and specific, in the audio/video object specified by parameter hAV. Parameter hAV is obtained by a prior call to EAAVCreateObject. This is an API function exported by an audio/video object library. In response to this function call, if the file contains video data, the audio/video object library calls the EASetDrawFunction, EASetWidth, and EASetHeight functions into the display mixer.

```
Parameter(s):
    HAV hAV                    // handle to an audio/video object
    LPSTR lpszFilename         // name of file to open
Return(s):
    EA_OK                      // function succeeded
    EA_FAILED                  // function failed
    EA_FILE_NOT_FOUND          // invalid path or filename
    EA_AVI_FILE_ERROR          // error in AVI file library
    EA_OUT_OF_MEMORY           // not enough memory to allocate needed structures and buffers
```

```
Parameter(s):
    HAV hAV                    // handle of audio/video object
Return(s):
    EA_OK                      // function succeeded
    EA_FAILED                  // function failed
    ED_INVALID_HANDLE          // invalid HAV
    EA_NOT_PLAYING             // the clip is not playing
```

EAAVPlay

The EAAVPlay function plays an audio/video clip. Play begins at a designated start position (dwFrom) and continues to a designated stop position (dwTo). The call returns immediately, but the clip continues to play until it reaches the stop position or is paused or stopped (by a call to EAAVPause or EAAVStop, respectively). EAAVPlay calls EACreateEvent to create an event with object-specific EA_EVENT_PLAY as the event to be created. EA_EVENT_PLAY is an event that is specific to the audio/video object library. EAAVPlay calls EAScheduleEvent to schedule the first sample to play immediately. To be able to call EAScheduleEvent, EAAVPlay needs to have a handle to a timer off of which events can be scheduled. If this timer was previously set, then EAAVPlay uses the previously set timer. If, however, there was no timer previously set, then EAAVPlay creates a timer using the EACreateTimer function with a time frequency appropriate to the sample rate of the audio/video file. It also calls EARepeatEvent to play subsequent samples. The optional parameters dwFrom and dwTo specify either samples or milliseconds, based on whether the timebase was modified by EAAVSetTimebase. if an application wants to specify dwTo and dwFrom but not dwplayFlags, it sets playFlags to 0. This is an API function exported by an audio/video object library. In response to this function call, the audio/video object library calls the EAScheduleEvent and EARepeatEvent functions into the event scheduler and the EAIncCurrentImage function into the surface/attribute manager.

```
Parameter(s):
    HAV hAV                    // handle of audio/video object
    DWORD dwPlayFlags          // optional flags
    DWORD dwFrom               // optional start position
    DWORD dwTo                 // optional ending position
Return(s):
    EA_OK                      // function succeeded
    EA_FAILED                  // function failed
    EA_INVALID_HANDLE          // invalid HAV
    EA_CODEC_ERROR             // an error occurred during decompression
The parameter dwPlayFlags can have the following value:
    P_REPEAT                   // repeat playing clip until an EAAVStop call is made
```

EAAVPreload

The EAAVPreload function preloads an audio/video clip at the current sample index. The clip is then ready to play as soon as EAAVPlay is called. Calling this function before calling EAAVPlay is not necessary, but doing so may improve performance. EAAVPreload reads in the first n samples and, if instructed to, hands them to the codec for decompression. If the PL_PERSISTENT flag is set, the buffers will be kept in memory until the application calls either EAAVFlush or EAAVDeleteObject. This is an API function exported by an audio/video object library.

```
Parameter(s):
    HAV hAV                    // handle of audio/video object
    DWORD dwPreloadFlags       // preload flags
    DWORD dwSamples            // number of samples to preload
Return(s):
    EA_OK                      // function succeeded
    EA_FAILED                  // function failed
    EA_INVALID_HANDLE          // invalid HAV
    EA_OUT_OF_MEMORY           // not enough memory to read in the samples requested
    EA_CODEC_ERROR             // an error occurred during decompression
The parameter dwPreloadFlags can have any combination of the following values:
    PL_ENTIRE_FILE             // preload entire file into memory
    PL_PERSISTANT              // keep samples in memory after playback
    PL_DECOMPRESS              // decompress samples after reading into memory (valid for video
                                  clips only)
```

EAAVResume

The EAAVResume function resumes playing a paused audio/video clip. EAAVResume recreates the event, reschedules it, and repeats it for the number of samples left in the audio/video clip. This is an API function exported by an audio/video object library. In response to this function call, the audio/video object library calls the EACreateEvent, EAScheduleEvent, and EARepeatEvent functions into the event scheduler.

EAAVSendCodecMessage

The EAAVSendCodecMessage function sends a message to the installed Codec. EAAVSendCodecMessage provides a mechanism for the application to send a message directly to the codec. This assumes the application knows which codec is installed, and knows the correct message format for that codec. This is an API function exported by an audio/video object library.

```
Parameter(s):
    HAV hAV                    // handle of audio/video object
Return(s):
    EA_OK                      // function succeeded
    EA_FAILED                  // function failed
    EA_INVALID_HANDLE          // invalid HAV
    EA_NOT_PAUSED              // the clip is not paused
```

EAAVSeek

The EAAVSeek function seeks forward or backward through an audio/video clip to the specified position. Parameter dwOrigin determines whether the seek originates at the beginning of the clip, end of the clip, or the current sample index. Parameter dwOffset determines whether the search direction is forward (positive values) or backward (negative values). The value of dwOffset is interpreted according to the setting of the timebase (i.e., in either samples or milliseconds). This is an API function exported by an audio/video object library. In response to this function call, the audio/video object library calls the EASetCurrentImage function into the surface/attribute manager.

```
Parameter(s):
    HAV hAV                    // handle of audio/video object
    DWORD dwOrigin             // position from which search is to begin
    DWORD dwOffset             // offset value
Return(s):
    EA_OK                      // function succeeded
    EA_FAILED                  // function failed
    EA_INVALID_HANDLE          // invalid HAV
    EA_INVALID_POS             // invalid sample number or time
The parameter dwOrigin can have the following values:
    SEEK_SET                   // beginning of audio/video clip
    SEEK_CUR                   // current sample index
    SEEK_END                   // end of audio/video clip
```

Parameter(s):
   HAV hAV              // handle of audio/video object
   LPVOID lpMsg         // pointer to message
Return(s):
   EA_OK                // function succeeded
   EA_FAILED            // function failed
   EA_INVALID_HANDLE    // invalid HAV

EAAVSetQuality

The EAAVSetQuality function sets the quality for an audio/video clip. This is an API function exported by an audio/video object library.

Parameter(s):
   HAV hAV              // handle of audio/video object
   DWORD dwQuality      // quality
Return(s):
   EA_OK                // function succeeded
   EA_FAILED            // function failed
   EA_INVALID_HANDLE    // invalid HAV

EAAVSetTableEntry

The EAAVSetTableEntry function fills in a table entry, and preloads the indicated audio/video clip. EAAVSetTableEntry fills in the entry for the vector table passed to it. It then preloads the audio/video clip associated with hAV. This is an API function exported by an audio/video object library.

Parameter(s):
   HTABLE hTable        // handle to the vector table
   WORD wEntryNum       // table entry number
   HAV hAV              // handle to the audio/video clip to be preloaded
   DWORD dwOffset       // offset to preload
Return(s):
   EA_OK                // function succeeded
   EA_FAILED            // function failed
   EA_INVALID_HANDLE    // invalid HTABLE or invalid HAV
   EA_OUT_OF_MEMORY     // not enough memory to preload the clip

EAAVSetTimebase

The EAAVSetTimebase function sets an audio/video object's timebase to either samples (TB_SAMPLES) or milliseconds (TB_MILLISECONDS). The default is samples. This is an API function exported by an audio/video object library.

Parameter(s):
   HAV hAV              // handle of audio/video object
   WORD timeBase        // timebase
Return(s):
   EA_OK                // function succeeded
   EA_FAILED            // function failed
   EA_INVALID_HANDLE    // invalid HAV
The possible values for the parameter timeBase are:
   TB_SAMPLES           // sets the timebase to samples (default)
   TB_MILLISECONDS      // sets the timebase to milliseconds

EAAVStop

The EAAVStop function stops the playback of an audio/video clip and resets the current sample index to the first sample in the clip. In the case of a video clip, the final stopped frame continues to be drawn until the application deletes the associated audio/video object by calling EAAVDeleteObject. To "stop" a clip without resetting the current sample index to the first sample, call EAAVPause, then call EAAVResume to resume playback from the current sample index. This is an API function exported by an audio/video object library. In response to this function call, the audio/video object library calls the EADeleteEvent function into the event scheduler.

```
Parameter(s):
    HAV hAV                        // handle of audio/video object
Return(s):
    EA_OK                          // function succeeded
    EA_FAILED                      // function failed
    EA_INVALID_HANDLE              // invalid HAV
```

Appendix B: Display Mixer Service Provider Interface Functions

This appendix contains the definitions of the functions of display mixer SPI 228 of FIG. 2.

EACreateObject

The EACreateObject function creates an object. EACreateObject allocates memory for an hObj plus the number of bytes requested by the object library (in dwExtraBytes). This function returns a handle for the newly created object. This is an SPI function exported by the display mixer.

```
Parameter(s):
    DWORD dwExtraBytes                  // number of extra bytes
    DEFAULT_ATTRIBS *pDefaultValues     // structure containing default values for attributes
    DWORD dwValidAttribs                // bit field identifying valid attributes
    LPHOBJ lphObj                       // handle to newly created object
Return(s):
    EA_OK                               // function succeeded
    EA_BAD_POINTER                      // lphObj is invalid
    EA_OUT_OF_MEMORY                    // system is out of memory
```

EADeleteObject

The EADeleteObject function deletes a specified object and frees the memory allocated for this hObj. This is an SPI function exported by the display mixer.

```
Parameter(s):
    HOBJ hObj                      // handle to an object
Return(s):
    EA_OK                          // function succeeded
    EA_BAD_HANDLE_TYPE             // hObj is invalid
```

EASetDrawFunction

The EASetDrawFunction function passes a pointer to the draw function for an object library. This is an SPI function exported by the display mixer.

```
Parameter(s):
    HOBJ hObj                      // handle to an object
    EARVAL (FAR PASCAL *fpDrawFn)(LPVOID, EADRAW_PARAMS FAR *)
                                   // pointer to draw function
Return(s):
    EA_OK                          // function succeeded
    EA_BAD_HANDLE_TYPE             // hObj is invalid
    EA_BAD_POINTER                 // fpDrawFn is invalid
```

EASetMsgFunction

The EASetMsgFunction function passes a pointer to a function which can be used to turn on and off effects that are to be applied to an object of an object library. This is an SPI function exported by the display mixer.

```
Paramter(s):
    HOBJ hOBj                                    // handle to an object
    EARVAL (FAR PASCAL *fpMsgFn)(LPVOID, DWORD, DWORD, void FAR *)
                                                 // pointer to function
Return(s):
    EA_OK                                        // function succeeded
    EA_BAD_HANDLETYPE                            // hObj is invalid
    EA_BAD_POINTER                               // fpMsgFn is invalid
```

EASetWidth

The EASetWidth function sets the width of the specified object to the specified width. This is an SPI function exported by the surface/attribute manager.

```
Parameter(s):
    HOBJ hOBj                // handle to an object
    unsigned long lWidth     // width
Return(s):
    EA_OK                    // function succeeded
    EA_BAD_HANDLE_TYPE       // hObj is invalid
```

EAGetWidth

The EAGetWidth function returns the width of the specified object. This is an SPI function exported by the surface/attribute manager.

```
Parameter(s):
    HOBJ hObj                    // handle to an object
    unsigned long FAR * lplWidth // width
Return(s):
    EA_OK                        // function succeeded
    EA_BAD_HANDLE_TYPE           // hObj is invalid
```

EASetHeight

The EASetHeight function sets the height of the specified object to the specified height. This is an SPI function exported by the surface/attribute manager.

```
Parameter(s):
    HOBJ hObj                // handle to an object
    unsigned long lHeight    // height
Return(s):
    EA_OK                    // function succeeded
    EA_BAD_HANDLE_TYPE       // hObj is invalid
```

EAGetHeight

The EAGetHeight function returns the height of the specified object. This is an SPI function exported by the surface/attribute manager.

```
Parameter(s):
    HOBJ hObj                      // handle to an object
    unsigned long FAR * lplHeight  // height
Return(s):
    EA_OK                          // function succeeded
    EA_BAD_HANDLE_TYPE             // hObj is invalid
```

What is claimed is:

1. A computer-implemented process for processing video signals in a video processing system, comprising the steps of:

(a) exporting, by a file-processing subsystem, functionality to an application to select optional preloading of a file by the file-processing subsystem;

(b) optionally selecting, by the application, preloading of the file; and (c) preloading the file, by the file-processing subsystem, in accordance with the optional selection by the application.

2. The process of claim 1, wherein:

the file-processing subsystem comprises an audio/video object library;

step (a) comprises the step of exporting the functionality to the application by the audio/video object library; and step (c) comprises the step of preloading the file by the audio/video object library.

3. The process of claim 1, wherein:

step (b) comprises the step of selecting, by the application, one of:
  (1) no preloading;
  (2) preloading without decompression and without persistence;
  (3) preloading with decompression and without persistence;
  (4) preloading without decompression and with persistence; and
  (5) preloading with decompression and with persistence.

4. The process of claim 1, wherein step (b) comprises the step of specifying, by the application, a number of video frames in the file to preload.

5. The process of claim 1, wherein step (b) comprises the step of specifying, by the application, that the entire file is to be preloaded.

6. The process of claim 1, wherein the file is stored on one of a hard drive and a compact disk.

7. The process of claim 1, wherein:

the file-processing subsystem comprises an audio/video object library;

step (a) comprises the step of exporting the functionality to the application by the audio/video object library;

step (b) comprises the steps of:
  (1) selecting, by the application, one of:
    (i) no preloading;
    (ii) preloading without decompression and without persistence;
    (iii) preloading with decompression and without persistence;
    (iv) preloading without decompression and with persistence; and
    (v) preloading with decompression and with persistence; and
  (2) specifying, by the application, a number of video frames to preload; and step (c) comprises the step of preloading the file by the audio/video object library.

8. The process of claim 7, wherein step (b) comprises the step of specifying, by the application, that the entire file is to be preloaded.

9. The process of claim 7, wherein the file is stored on one of a hard drive and a compact disk.

10. A computer system for processing video signals, comprising:
   (a) means for exporting functionality to an application to select optional preloading of a file, wherein the application optionally selects preloading of the file; and
   (b) means for preloading the file in accordance with the optional selection by the application.

11. The system of claim 10, wherein:
   means (b) preloads the file, as specified by the application, according to one of:
   (1) no preloading;
   (2) preloading without decompression and without persistence;
   (3) preloading with decompression and without persistence;
   (4) preloading without decompression and with persistence; and
   (5) preloading with decompression and with persistence.

12. The system of claim 10, wherein means (b) preloads an application-specified number of video frames.

13. The system of claim 10, wherein means (b) preloads the entire file as specified by the application.

14. The system of claim 10, wherein the file is stored on one of a hard drive and a compact disk.

15. The system of claim 10, wherein:
   means (b) preloads the file, as specified by the application, according to one of:
   (1) no preloading;
   (2) preloading without decompression and without persistence;
   (3) preloading with decompression and without persistence;
   (4) preloading without decompression and with persistence; and
   (5) preloading with decompression and with persistence; and
   means (b) preloads an application-specified number of video frames.

16. The system of claim 15, wherein means (b) preloads the entire file as specified by the application.

17. The system of claim 15, wherein the file is stored on one of a hard drive and a compact disk.

18. An audio/video object library for a video processing system, wherein:
   the audio/video object library exports functionality to an application to select optional preloading of a file by the audio/video object library, wherein the application optionally selects preloading of the file; and
   the audio/video object library preloads the file in accordance with the optional selection by the application.

19. The audio/video object library of claim 18, wherein:
   the audio/video object library preloads the file, as specified by the application, according to one of:
   (1) no preloading;
   (2) preloading without decompression and without persistence;
   (3) preloading with decompression and without persistence;
   (4) preloading without decompression and with persistence; and
   (5) preloading with decompression and with persistence.

20. The audio/video object library of claim 18, wherein the audio/video object library preloads an application-specified number of video frames.

21. The audio/video object library of claim 18, wherein the audio/video object library preloads the entire file as specified by the application.

22. The audio/video object library of claim 18, wherein the file is stored on one of a hard drive and a compact disk.

23. The audio/video object library of claim 18, wherein:
   the audio/video object library preloads the file, as specified by the application, according to one of:
   (1) no preloading;
   (2) preloading without decompression and without persistence;
   (3) preloading with decompression and without persistence;
   (4) preloading without decompression and with persistence; and
   (5) preloading with decompression and with persistence; and
   the audio/video object library preloads an application-specified number of video frames.

24. The audio/video object library of claim 23, wherein the audio/video object library preloads the entire file as specified by the application.

25. The audio/video object library of claim 23, wherein the file is stored on one of a hard drive and a compact disk.

* * * * *